United States Patent [19]

Hamaguchi et al.

[11] Patent Number: 5,280,396
[45] Date of Patent: Jan. 18, 1994

[54] VIDEO SIGNAL PROCESSING APPARATUS FOR CORRECTING TIME BASE OF VIDEO SIGNAL

[75] Inventors: Masakazu Hamaguchi, Yokohama; Takashi Furuhata, Kamakura; Hiroaki Takahashi, Yokohama, all of Japan

[73] Assignee: Hitachi, Ltd., Tokyo, Japan

[21] Appl. No.: 770,450

[22] Filed: Oct. 3, 1991

[30] Foreign Application Priority Data

Oct. 3, 1990 [JP] Japan .................................. 2-263900

[51] Int. Cl.$^5$ ................................................ H04N 5/78
[52] U.S. Cl. ...................................... 360/36.1; 358/154
[58] Field of Search .................. 360/36.1, 38.1, 36.2; 358/336, 337, 339, 150, 153, 154, 148, 159

[56] References Cited

U.S. PATENT DOCUMENTS

| | | | |
|---|---|---|---|
| 4,165,524 | 8/1979 | Ninomiya | 358/339 X |
| 4,473,850 | 9/1984 | Foerster et al. | 360/38.1 X |
| 4,853,914 | 8/1989 | Okano et al. | 360/36.2 X |
| 4,891,699 | 1/1990 | Hamada et al. | 360/38.1 X |
| 5,093,732 | 3/1992 | Yoshinaka | 360/36.2 X |
| 5,119,209 | 6/1992 | Okano | 358/339 |

Primary Examiner—Andrew L. Sniezek
Attorney, Agent, or Firm—Antonelli, Terry, Stout & Kraus

[57] ABSTRACT

An apparatus for correcting a time base of a video signal includes a first memory having a capacity of one line of a video signal and a second memory having a capacity of N lines of the video signal connected to the first memory. A video signal is written in the first memory according to a first control signal generated based on synchronizing information in the video signal and first clock pulses synchronized with the synchronizing information, the video signal written in the first memory is read from the first memory and written in the second memory according to a second control signal generated based on second clock pulses, and the video signal written in the second memory is read from the second memory based on a reference signal generated based on the second clock pulses.

10 Claims, 16 Drawing Sheets

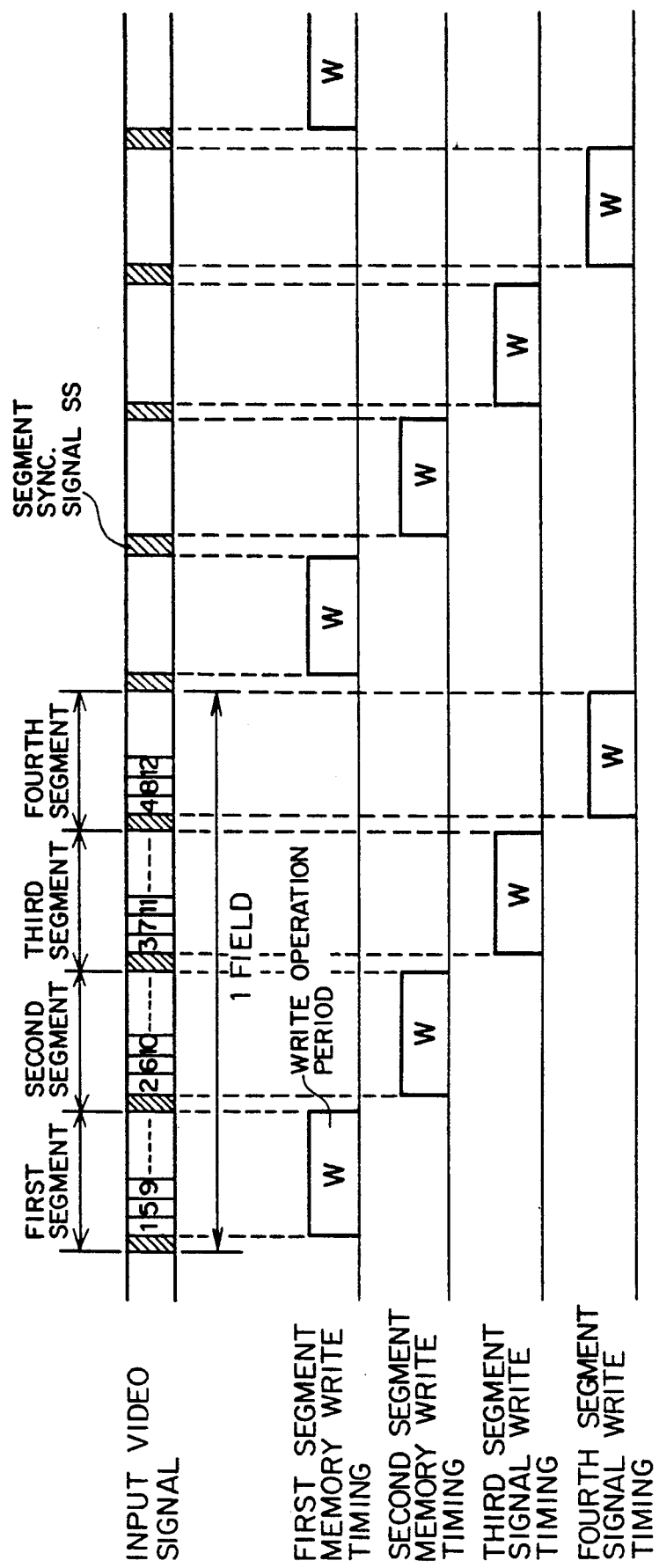

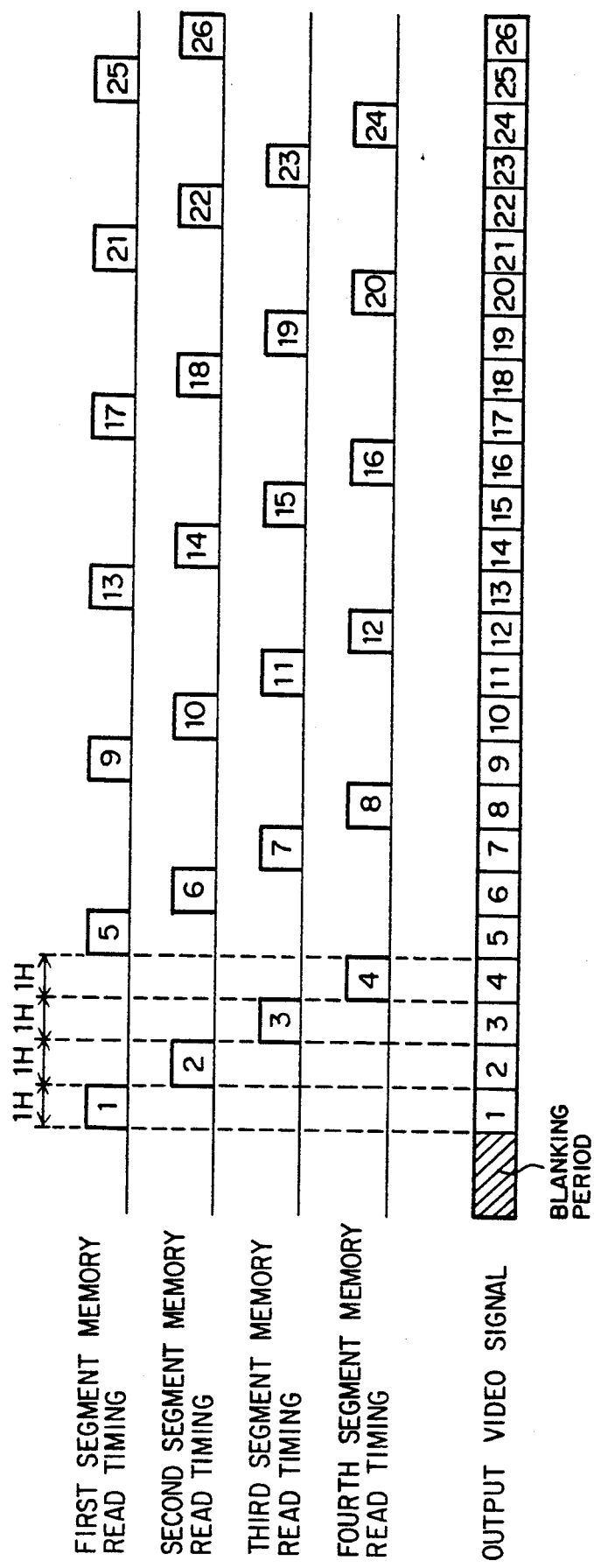

VIDEO SIGNAL PROCESSING APPARATUS FOR CORRECTING TIME BASE OF VIDEO SIGNAL

BACKGROUND OF THE INVENTION

This invention relates to a signal processing apparatus for correcting a time base variation of a video signal output by an image producing apparatus.

In magnetic recording/reproducing apparatuses such as a VTR or image reproducing apparatuses such as a video disk apparatus, a time base variation in the reproduced video signal occurs due to a variation in the relative position between a signal detecting medium such as a magnetic head or a pickup head and a recording medium such as a magnetic tape or disk. When the time base variation is moderate, a gentle change of the time base will cause a jitter in the reproduced picture. On the other hand, when the time base is subjected to rapid changes, a vast change of the time base will cause a skew in the reproduced picture.

As described above, those reproducing apparatuses have a intrinsic drawback of notably impairing the stability of the reproduced images.

As a reproduced video signal processing apparatus to correct the time base variation, a video signal processing apparatus shown in FIG. 1 has been well-known and is described, for example, in Japan Broadcast Publishing Co., Ltd., Hoso Gijutsu Sohsho Vol. 5: VTR Technology, Chapter 6.

In FIG. 1, reference numeral 10 indicates an input terminal of a video signal having time base variations and 20 indicates an output terminal of the video signal in which the time base variations have been corrected. Reference numeral 1 indicates an A/D converter circuit to convert an input video signal into a digital signal, 2 a RAM (a memory which permits quick direct access to a memory location for reading or writing data at any time). Reference numeral 4 indicates a synchronizing separation circuit, which extracts horizontal synchronizing signals containing time base variations from the composite video signal. The horizontal synchronizing signals are supplied to a write clock generator circuit 40 and a write address control circuit 70.

Synchronized with the above-mentioned horizontal synchronizing signals, the write clock generator circuit 40 generates write clock pulses timed with the time base variations of the input video signal from terminal 10. The write address control circuit 70 outputs a write address in step with the above-mentioned write clock pulses. The video signal having the time base variations coming from the terminal 10 is converted into a digital signal successively by the A/D converter circuit 1 in step with the write clock pulses, and is written at specified addresses in the memory 2.

On the other hand, stable reference synchronizing signals without time base variations are applied to a terminal 30. A read clock generator circuit 90 generates read clock pulses synchronized with the reference synchronizing signals. A read address control circuit 80 outputs a read address in step with the read clock pulses mentioned above. Therefore, digital data of the video signal stored in the memory 2 is read sequentially from the specified read addresses mentioned above. The digital data which has been read is converted sequentially into an analog signal in step with the read clock pulses by a D/A conversion circuit 3. As a result, a stable video signal without time base variation is output from terminal 20.

As mentioned earlier, the memory 2 is generally formed by a RAM, and if the number of samples of the input video signal in one horizontal scanning period (hereafter referred to as 1 H) is denoted by n, a correction amount of the time base variation by $\pm kH$ and the number of bits of the A/D converter circuit 1 by m, then the memory 2 requires a capacity of at least $n \times (2 \times k) \times m$ bits, and it is necessary to control $N \times (2 \times k)$ addresses. The address control is done by a counter, for example, and the control method is so complicated that the circuit has to be large in size, which has been a problem.

Above all, in write address control, the write addresses are controlled by the write address control circuit 70 according to the vertical and horizontal synchronizing signals included in the input video signal and also in step with the write clock pulses mentioned above. However, it is necessary to make considerable contrivances in designing the circuit to make up for lost vertical and horizontal and synchronizing signals to carry on specified write address control to store digital data from the A/D converter circuit 1 in the specified address area of the memory 2 when any of the vertical and horizontal synchronizing signals is lost. The signal processing method is complicated so that the circuit size has to be large, which has been another problem.

There is still another problem that if the synchronizing information which has dropped out fails to be interpolated, the specified signal processing mentioned above will be disturbed substantially.

SUMMARY OF THE INVENTION

The object of the present invention is to provide a video signal processing apparatus for signal processing at high speed, which apparatus requires a smaller circuit size, is capable of stable operation without malfunctioning in all cases and is provided with a necessary and sufficient correction amount of the time base variation.

In order to achieve the above object, according to the present invention, there is provided a reproduced video signal processing apparatus comprising a first memory for storing video information for one line, a second memory for storing video information for N lines (N being an integer of 2 or more), the first and second memories being connected in a cascade connection, synchronizing information separating means for separating synchronizing information from the input video signal, first clock generating means for generating clock pulses of a specified frequency synchronized with the input video signal, first control means for generating a specified first control signal according to the first clock pulse and the synchronizing information mentioned above, second clock generating means for generating clock pulses of a specified frequency, second control means for generating a specified second control signal which is stable and phase-locked with the input video signal according to the second clock pulses and a signal representing the rotational phase of the magnetic head or the above-mentioned synchronizing information, and reference signal generating means for generating a specified reference signal, wherein the input video signal is written sequentially in a specified address area of the first memory according to the first control signal, the video signal which has been written in the first memory is read sequentially according to the second control signal, the thus read video signal is written sequentially in a specified address area of the second memory according to the second control signal, and according to the reference synchronizing signal, the video signal written in the second memory is read sequentially.

After the write address for each line is initialized by a first control signal, the first memory operates in such a way that video information is written sequentially in units of one line in a specified address area in step with the first clock pulses. And, after the read address is initialized every 1 H by a second control signal mentioned above, the first memory operates such that the video information written in the specified address are is read sequentially in units of one line, phase-locked with the input video signal. In the manner as described, the first memory functions as a one-line buffer memory, and when there is an omission in synchronizing information due to a dropout, for example, or when noise N is erroneously separated along with synchronizing information by the synchronizing information separation circuit, only the video information of the line in question is disturbed, but none of those phenomena have any effect on the other lines. Therefore, it is possible to read video information from the first memory accurately in units of one line without making any contrivances for the circuit such as adding a function to interpolate missing synchronizing information to enable specified signal processing.

After the write addresses are initialized every N lines by a second control signal, the second memory operates such that the video information which is read from the first memory in units of N lines is written sequentially into a specified address area, phase-locked with the input video signal. After the read addresses are initialized every N lines by a reference signal mentioned above, the second memory operates such that the above-mentioned video information written in the specified address area is read correctly on a stable time base in units of N lines. By this arrangement, the second memory functions as a buffer memory and can obtain a specified correction amount of the time base variation for a maximum of ±N/2 lines.

If the first and second memories are FIFO memories, address signals are not required, and therefore the address generating circuits can be eliminated. This enables write/read operations to be performed at higher speed, and the whole signal processing can be done at higher speed.

As has been described, it is possible to form a reproduced video signal processing apparatus which has a circuit reduced in size, operates stably without malfunctioning in all cases, performs signal processing at high speed in a simple manner, and is provided with a necessary and sufficient correction amount for the time base variation. This reproduced video signal processing apparatus can stably and securely eliminate the time base variation included in the input video signal.

BRIEF DESCRIPTION OF THE DRAWINGS

FIGS. 17A and 17B are waveform diagrams showing the operation of the embodiment in FIGS. 16A and 16B.

DESCRIPTION OF THE PREFERRED EMBODIMENTS

Embodiments of the present invention will be described below.

Figure 2:
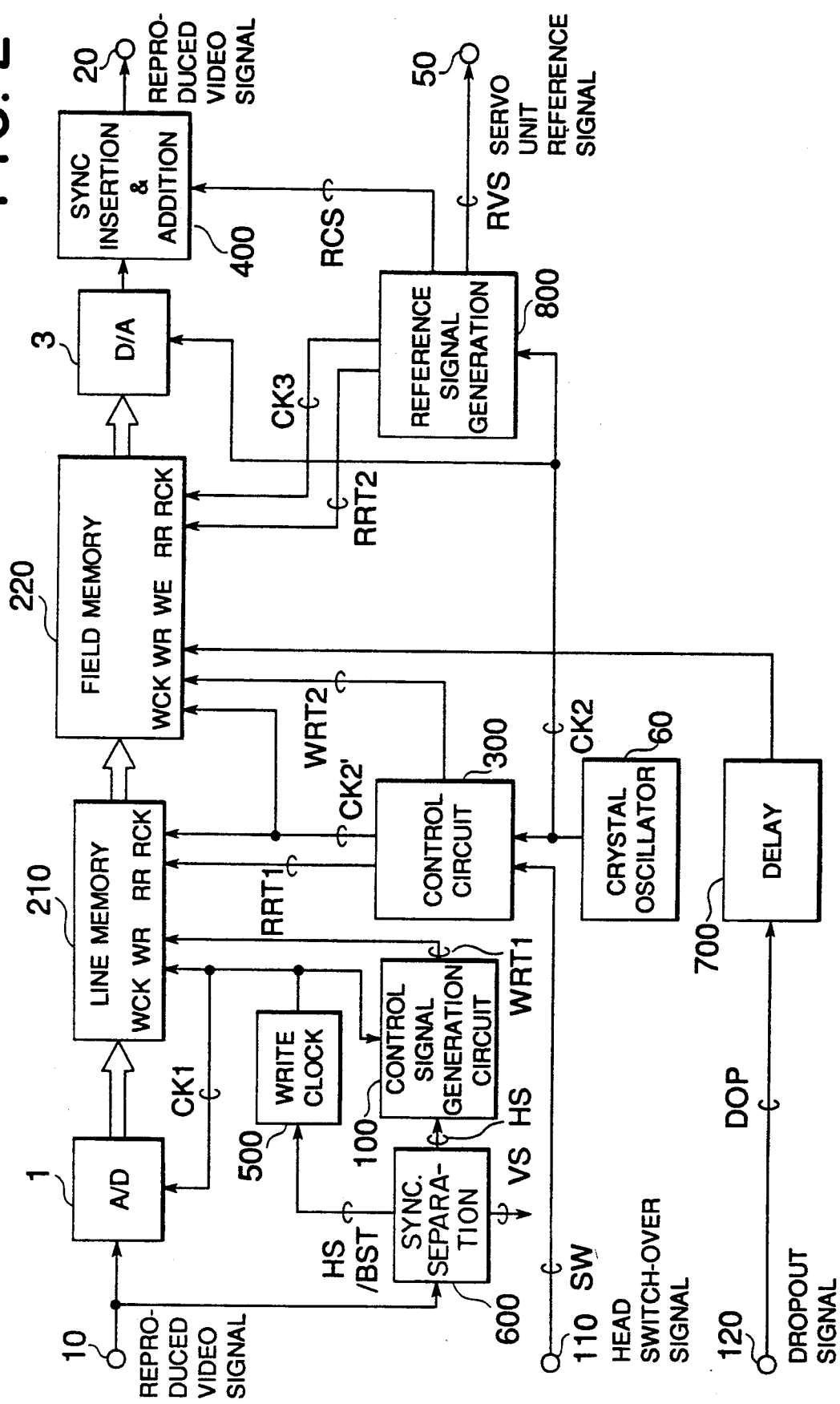
FIG. 2 is a block diagram showing an embodiment of a reproduced video signal processing apparatus according to this invention.
Figure 5:
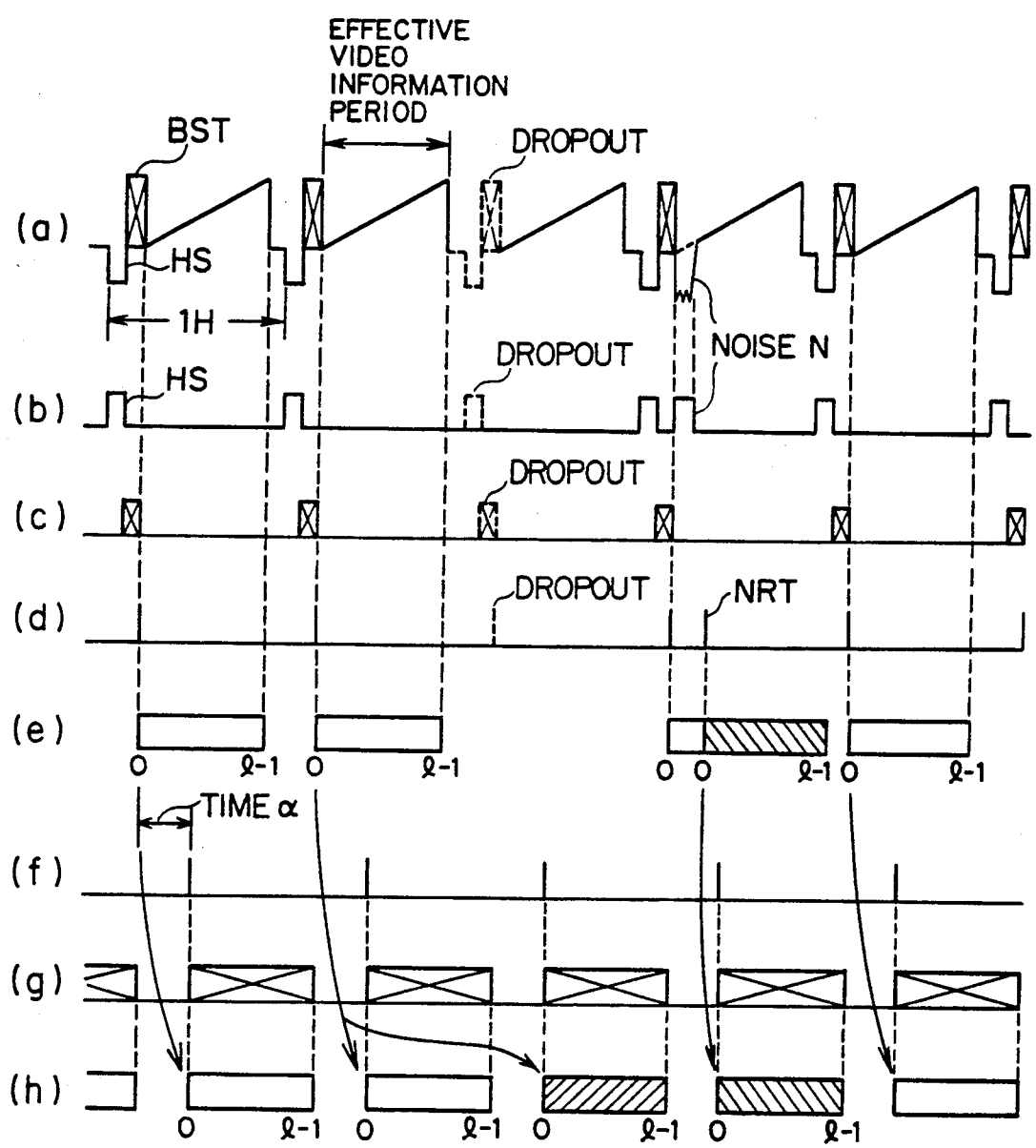
FIGS. 5 and 6 are waveform diagrams showing the write operation in the line memory in FIG. 2.
Figure 6:
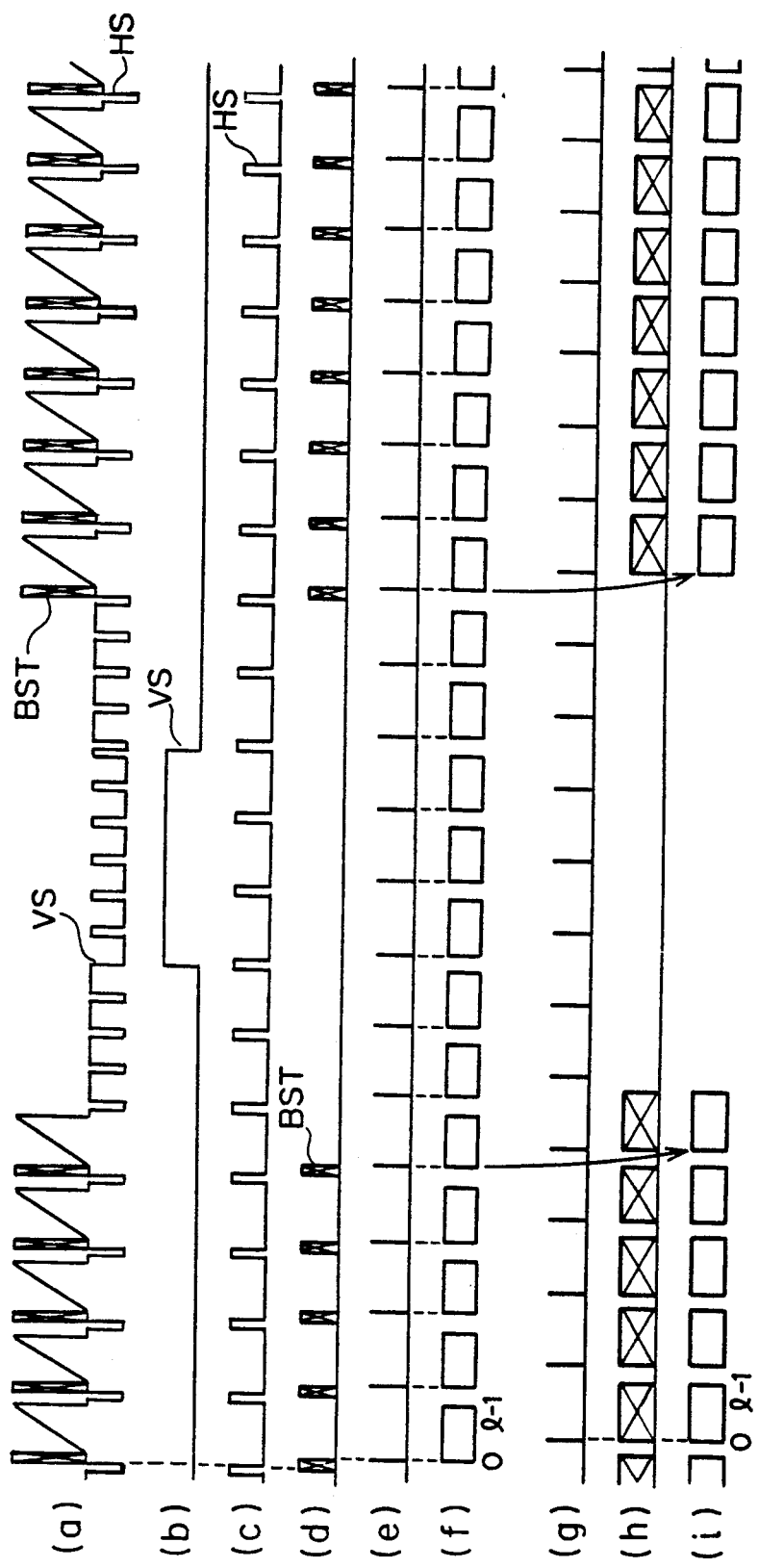

FIG. 2 is a block diagram showing an embodiment of the reproduced video signal processing apparatus according to the present invention. FIGS. 5 and 6 are waveform diagrams for explaining the write operation of the above-mentioned apparatus. An A/D converter 1 and a D/A converter circuit 3 in FIG. 2 are identical with those of the prior art and are designated by the same reference numerals.

In FIG. 2, a video signal ((a) in FIG. 5 and (a) in FIG. 6) having time base variations is input through the terminal 10, and supplied to an A/D converter circuit 1 and a synchronizing information separation circuit 600. The synchronizing information separation circuit 600 separates from the input video signal and outputs vertical synchronizing signals VS ((b) in FIG. 6), horizontal synchronizing signals HS ((b) in FIG. 5, (c) in FIG. 6), and burst signals BST ((c) in FIG. 5, (d) in FIG. 6), the burst signals being superposed on the video signal in horizontal blanking periods.

As described in the above-mentioned literature, a write clock generator circuit 500 comprises an AFC circuit based on the horizontal synchronizing signals HS or an APC circuit based on the burst signals BST instead of the horizontal synchronizing signals HS or a combined circuit of an AFC circuit based on the horizontal synchronizing signals HS and an APC circuit based on the burst signals BST. The write clock generator circuit 500 generates write clock pulses CK1 (frequency $f_1$) timed with the time base variations of the input video signal. Therefore, the video signal having the time base variations, which signal is input through the terminal 10, is converted by the A/D converter 1 sequentially from an analog signal to a digital signal in step with write clock pulses CK1 from the write clock generator circuit 500, and supplied to a line memory 210.

With regard to this embodiment, description will be made of a case in which a FIFO memory is used for the line memory 210, the FIFO memory permitting the write and read operations to be performed independently and asynchronously to each other.

The horizontal synchronizing signals HS output from the synchronizing information separation circuit 600 are supplied to a control signal generator circuit 100. While delaying the supplied horizontal synchronizing signals HS for a specified time, based on clock pulses CK1, the control signal generator circuit 100 generates write reset signals WRT1 ((d) in FIG. 5, (e) in FIG. 6) indicating the start position in each effective video signal period of each line of the input video signal and supplies the write reset signals WRT1 to the write reset terminal WR of the line memory 210.

Figure 3:
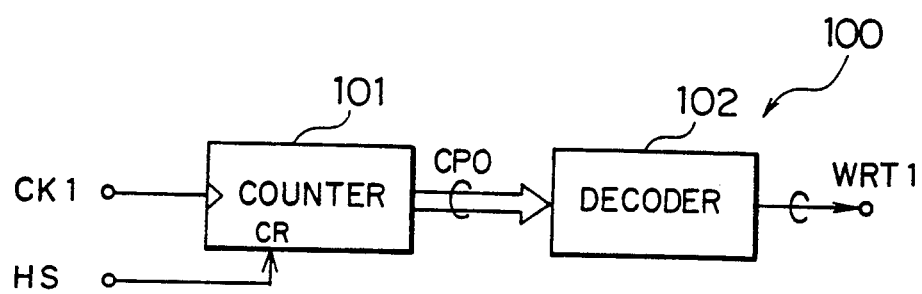
FIG. 3 shows a composition example of the control signal generator circuit 100 in FIG. 2.
Figure 4:
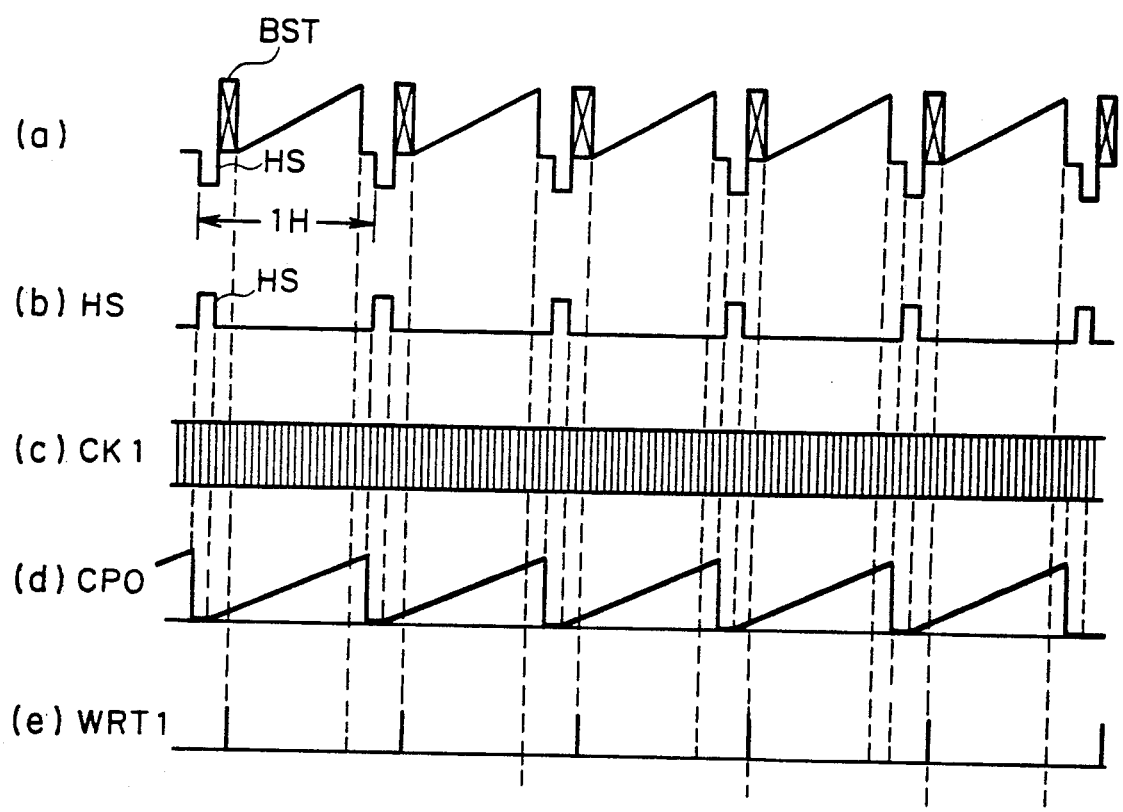
FIG. 4 is a waveform diagram showing the operation of the circuit shown in FIG. 3.

FIGS. 3 and 4 are respectively a composition diagram and a waveform diagram of the operation of the control signal generator circuit 100. As shown in FIGS. 3 and 4, the control signal generator circuit 100 comprises a counter 101 for initializing the count output with a horizontal synchronizing signal and a decoder 102 to decode the count output CPO of the counter 101 with a predetermined value and outputs a write reset signal WRT1.

The line memory 210 is a FIFO memory which has a capacity to store effective video information (sample number l) exclusive of redundant video information such as a horizontal blanking period in the input video signal for at least 1 H, and which enables write and read operations to be performed independently and asynchronously to each other.

After the write addresses are initialized (preset to address 0) at the start position of the effective video signal of each line by the write reset terminal WR, the line memory 210 operates such that the video information output from the A/D converter circuit 1 is written sequentially in a specified address area in step with clock pulses CK1 supplied to the write clock terminal WCK. As described above, the write addresses are initialized at the start position of the effective video signal of each line, and therefore, the effective video information (sample number l) of each line is written in units of one line invariably in the area from address 0 to address (l−1)((h) in FIG. 5, (i) in FIG. 6).

Description will now be made of a case in which effective information written every one H in the specified address area of the line memory 210 is read.

The effective information written in the line memory 210 is read regardless of the above-mentioned write operation, but according to read reset signals RRT1 ((f) in FIG. 5, (g) in FIG. 6) and clock pulses CK2' (frequency $f_1$; (g) in FIG. 5, (h) in FIG. 6) generated by a control circuit 300 and respectively supplied to the read reset terminal RR and the read clock terminal RCK of the line memory 210. The read reset signal RRT1, which will be described later, is a signal which occurs with cycles of 1 H and never drops out and which is phase-locked with the input video signal ((a) in FIG. 5, (a) in FIG. 6), including time base variations, input via the terminal 10, and the read reset signal RRT1 lags the write reset signal WRT1 by time $\alpha$ ($0<\alpha<1$ H). Therefore, invariably after the read addresses are initialized (preset to address 0) every 1 H by a read reset signal RRT1, the line memory 210 operates such that effective video information of each line written in the area, from address 0 to address (l−1) is read sequentially and stably in units of one line without malfunctioning according to the clock pulses CK2' with a delay of time $\alpha$ from the write start point at the timing shown in (h) in FIG. 5 and (i) in FIG. 6 and with the signal phase locked with the input video signal. At this time, as shown in (g) in FIG. 5 and (h) in FIG. 6, in the portion which does not include effective video information such as horizontal and vertical blanking periods, the clock pulses CK2' are stopped to prevent redundant video information such as horizontal and vertical blanking periods from being read from the line memory 210, so that only the effective video information exclusive of the redundant video information is read accurately in units of one line without excess or deficiency of even one sample.

As shown in FIGS. 5 and 6, if a horizontal synchronizing signal HS is lost by a dropout, for example, the line memory operates as follows. When a horizontal synchronizing signal HS is lost by a dropout, a write reset signal WRT1 based on the horizontal synchronizing signal HS is not generated ((d) in FIG. 5). For this reason, until a write reset signal WRT1 generated based on a horizontal synchronizing signal HS, which is separated out next, is supplied newly to the write reset terminal WR, the write addresses are not initialized. Therefore, during this period, effective video information of a line at which the horizontal synchronizing signal HS is missing is not written in the area from address 0 to address (l−1), and the effective video information written previously is maintained ((e) in FIG. 5). More specifically, the line memory 210 operates such that when a horizontal synchronizing signal HS is separated, the effective video information of the line concerned is written in the area from address 0 to address (l−1), and when the horizontal synchronizing information drops out, the effective video information written previously is maintained.

On the other hand, as mentioned earlier, the line memory 210 functions so that effective video information is written in the area from address 0 to address (l−1) is read regardless of the above-mentioned write operation according to a read reset signal RRT1 and clock pulses CK2'.

Therefore, when a horizontal synchronizing signal HS fails to be present, for the line at which a horizontal synchronizing signal HS is missing, the effective video information of the previous line is read again. Without any contrivances being made to make up for the missing horizontal synchronizing signal HS to enable specified signal processing, effective video information of the line with no horizontal synchronizing signal HS is automatically replaced with the effective video information of the previous line, and therefore, from the line memory 210, effective video information (sample number l) of each line can be read in units of one line with no excess or deficiency of even one sample.

Figure 1:
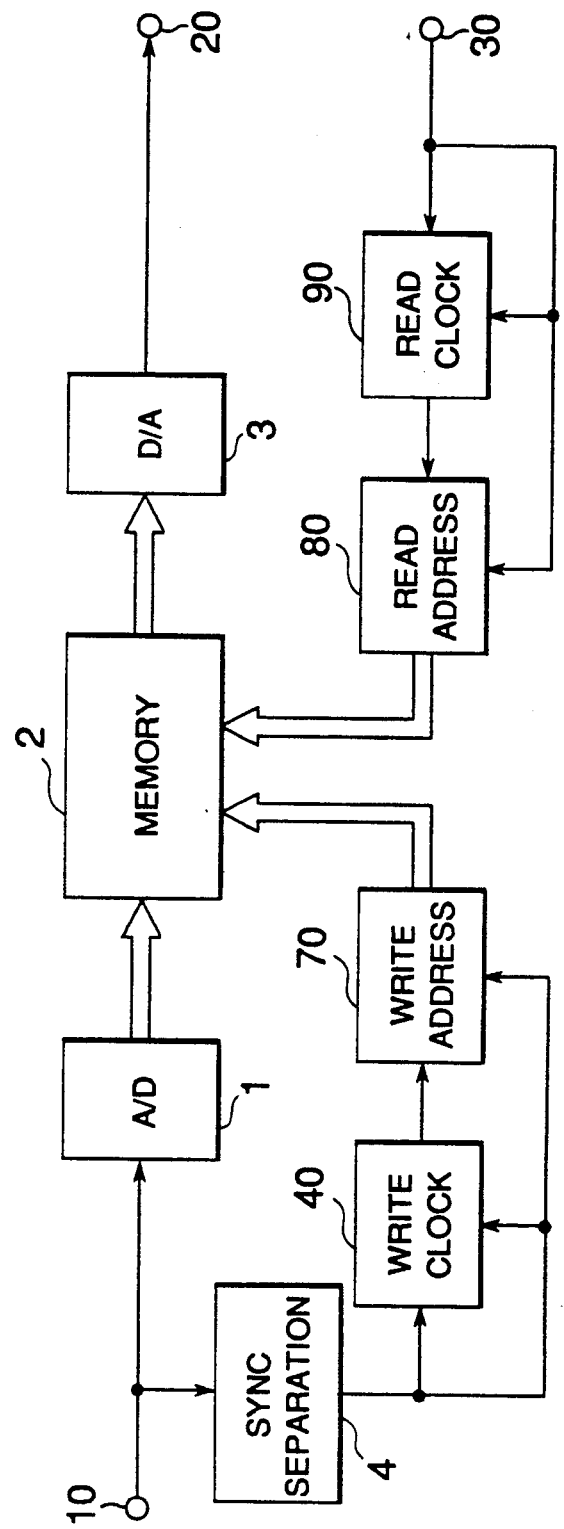
FIG. 1 is a block diagram showing the composition of the prior art.

In addition, as indicated by (b) in FIG. 5, owing to an occurrence of a dropout or noise, if noise N is separated along with a horizontal synchronizing signal HS by the synchronizing information separation circuit 600 of FIG. 1, the line memory 210 operates in the manner described below.

When noise N is separated along with a horizontal synchronizing signal HS erroneously, a wrong write reset signal NRT ((d) in FIG. 5) resulting from the noise N is generated in the control signal generator circuit 100 in FIG. 2. For this reason, in the line memory 210, as shown in (e) in FIG. 5, the write addresses are initialized by a wrong write reset signal NRT outside the specified start position of the effective video signal. After this, video information is written sequentially again starting with address 0. Therefore, effective video information (sample number l) of the line concerned cannot be written as specified in the initially defined area from address 0 to address (l−1). However, when a horizontal synchronizing signal HS is separated at the next line, the line memory operates in such a way as to allow effective video information of the line concerned to be written as specified sequentially in the specified manner in the area from address 0 to address (l−1) assigned by noise N.

Therefore, when noise N is separated erroneously, out of the effective video information of the lines read from the line memory 210, effective video information of the line at which noise N was separated erroneously is no longer a correct video information as shown in (h) of FIG. 5, but by virtue of the use of the line memory 210, this malfunction by noise N is confined within this one line. Therefore, this erroneous operation does not have any effect on the write and read operations at the other lines, and effective video information (sample number l) of each line can be read in units of 1 H from the line memory 210 without reading even one sample too many or too few.

As is obvious from the above description, the line memory 210 functions as a buffer memory for one line. By using this line memory 210, when a horizontal synchronizing signal HS is lost by dropout or noise or when noise N is separated along with a horizontal synchronizing signal HS erroneously, the effective video information of the line in question is simply either replaced with that of the previous line or disturbed. Therefore, such a malfunction is confined within the line in question, so that the effective video information of the other lines is not affected at all, nor is signal processing or the reproduced picture disturbed. As a result, if the line memory 210 is used, even when a horizontal synchronizing signal HS fails to occur or noise N is separated erroneously, it is not necessary to attempt to rectify such phenomena with a specially contrived circuit which makes up for the lost horizontal synchronizing signal HS to carry on specified signal processing. And, by the simple circuit and simple signal processing, effective video information exclusive of redundant video information such as vertical and horizontal blanking periods can be read stably with no excess or deficiency of even one sample.

Next, description will be made of a control circuit 300 which generates read reset signals RRT1 and clock pulses CK2' required for reading from the line memory only effective video information in units of 1 H without reading even one sample too many or too few, by referring to an example in which this invention is applied to a helical scanning magnetic recording/reproducing apparatus for recording the video signal of one vertical scanning period (hereafter referred to as 1 V) on one track.

Figure 7:
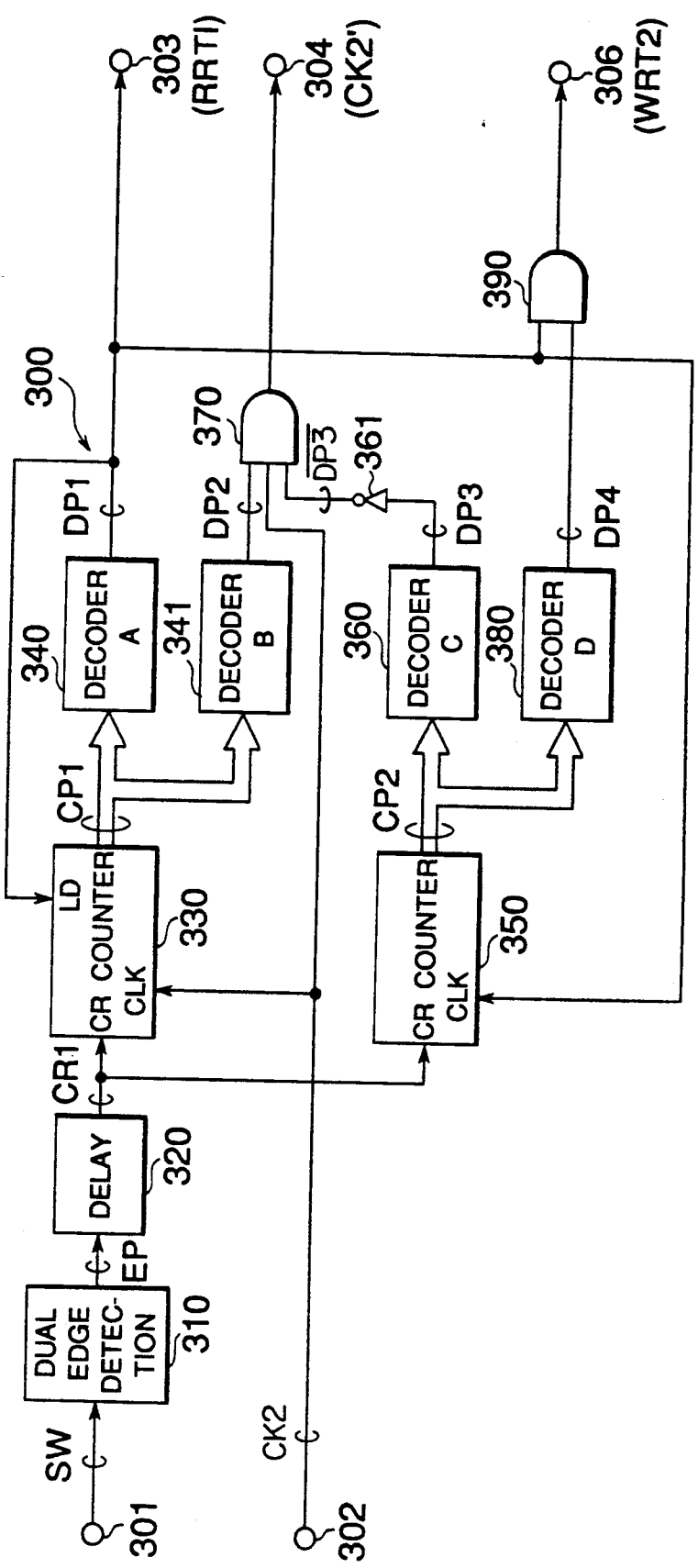
FIG. 7 shows a composition example of the control circuit 300 in FIG. 2.

In FIG. 2, input through a terminal 110 is a head switch-over signal SW to control the timing of head switching, which signal is generated synchronized with the rotation of the magnetic head. The head switch-over signal SW is supplied to the control circuit 300. In addition, reference clock pulses CK2, output from a crystal oscillator circuit 60, are supplied to the control circuit 300. The read reset signals RRT1 and clock pulses CK2' are generated based on the head switch-over signals SW and the reference clock pulses CK2. FIG. 7 shows a concrete embodiment of the control circuit 300, and FIG. 8 is a waveform diagram for explaining the operation of the control circuit of FIG. 7.

In FIG. 7, a terminal 301 is an input terminal of head switch-over signal SW, and a terminal 302 is an input terminal of reference clock pulses CK2. The reference clock pulses CK2 are stable and continuous clock pulses ((e) in FIG. 8) with a frequency of $f_1$ (the same frequency as the write clock pulses CK1 mentioned above). The head switch-over signal SW ((b) in FIG. 8) is generated based on TACH pulses detected by a magnet on the rotating drum fitted with magnetic heads and a stationary TACH head. Therefore, the head switch-over signal SW is a signal which represents the rotational phase of the magnetic heads and which is phase-locked with the video signal ((a) in FIGS. 5, 6 and 8) having the time base variations, which signal is input from the terminal 10 in FIG. 2.

Figure 8:
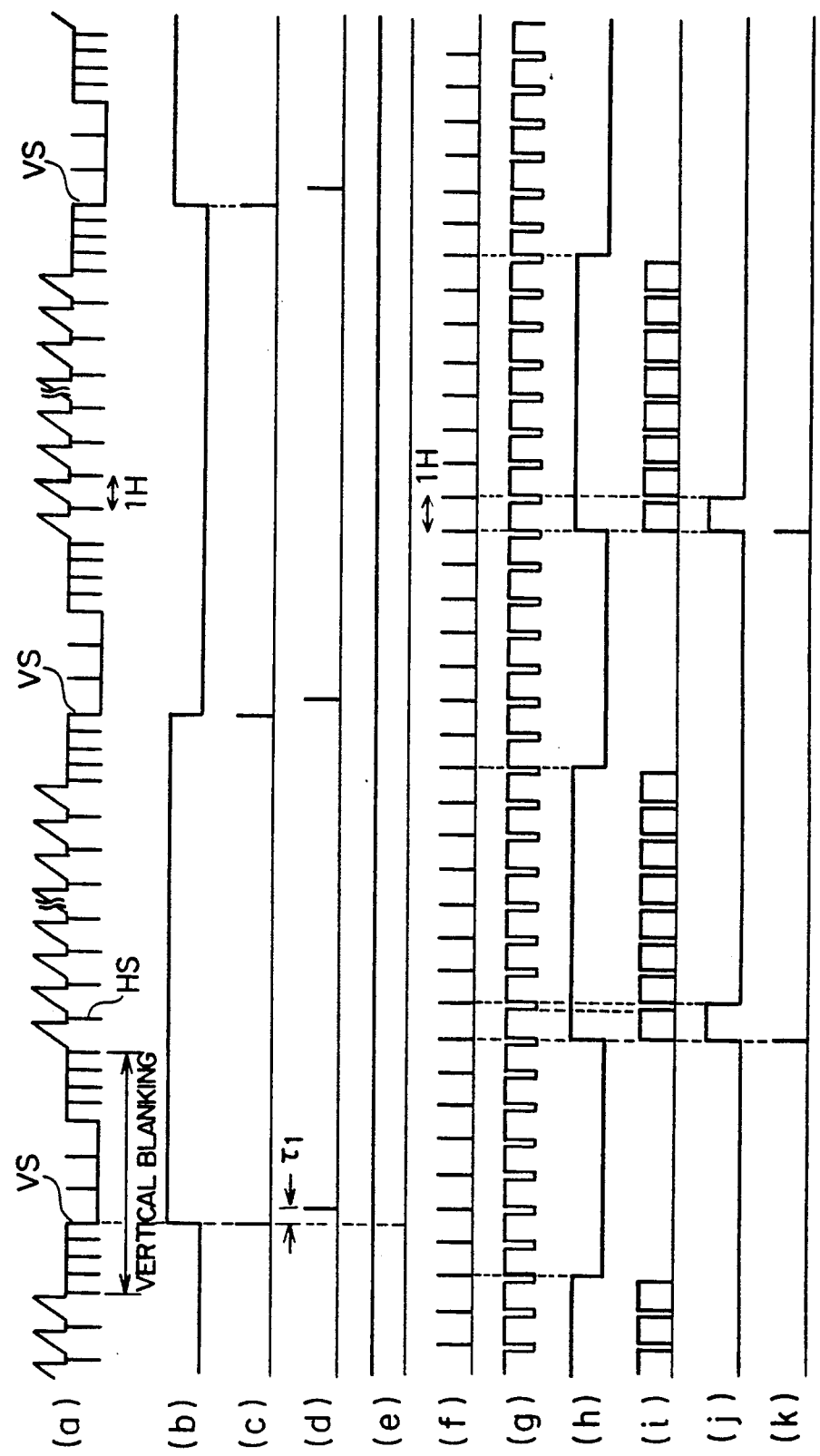
FIG. 8 is a waveform diagram showing the operation of the control circuit of FIG. 7.

The head switch-over signal SW ((b) in FIG. 8) input from the terminal 301 is supplied to a dual-edge detector circuit 310. The dual-edge detector circuit 310 detects both edges of the head switch-over signal SW, and outputs dual-edge detection signals EP phase-locked with the two edges of the head switch-over signal SW as shown in (c) of FIG. 8. The dual-edge detection signals EP are delayed for a specified time $\tau_1$ by a delay circuit 320 and supplied to a clear terminal of a counter 330 as clear signals CR1 ((d) in FIG. 8). On the other hand, reference clock pulses CK2 input through the terminal 302 are supplied to a clock terminal CLK of the counter 330. These clear signals CR1 are signals which occur every 1 V phase-locked with the video signal ((a) in FIGS. 5, 6 and 8). The counter 330, after being initialized by a clear signal CR1 every 1 V phase-locked with the video signal, counts the reference clock pulses CK2. A decoder A 340 receives a count output CP1 of the counter 330. When the count output CP1 reaches a predetermined value, the decoder 340 outputs a decoding signal DP1 ((f) in FIG. 8). In the decoder A 340, a decode value is set so as to output a decoding signal DP1 when the counter 330 has counted the number of clock pulses corresponding to 1 H. The decoding signal DP1 is supplied to a terminal 303 and to a preset terminal LD of the counter 330 as well. After having its count preset to a predetermined value by a decoding signal DP1 supplied to the preset terminal LD, the counter 330 counts again reference clock pulses CK2 supplied to the clock terminal CLK. When the set value is zero, the counter 330 operates such that after the count is initialized every 1 V by a clear signal CR1, the count is preset to the set value (zero) by a decoding signal DP1. Therefore, as shown in (f) in FIG. 8, decoding signals DP1 become signals of 1 H periods, which are phase-locked with the video signal every 1 V by a clear signal CR1. In other words, the decoding signal DP1 is the read reset signal RRT1 shown in (f) in FIG. 5 and in (g) in FIG. 6, and is output through the terminal 303 to the read reset terminal RR of the line memory 210. Incidentally, the read reset signal RRT1 ((f) in FIG. 5, (g) in FIG. 6) is a signal that lags the write reset signal WRT1 ((d) in FIG. 5, (e) in FIG. 6) by time $\alpha$, and can be realized by adjusting delay time $\tau_1$ of the delay circuit 320. More specifically, by adjusting $\tau_1$, the initializing timing of the counter 330 can be adjusted (in other words, the output timing of decoding signals DP1 can be adjusted with respect to the video signal), and the delay time $\tau_1$ has only to be set so that the read reset signals RRT1 lag the write reset signals WRT1 by time $\alpha$.

As has been described, read reset signals RRT1 are generated stably based on head switch-over signal SW ((b) in FIG. 8), and become signals phase-locked with the video signal ((a) in FIG. 8). Therefore, the phase relationship between the read reset signals RRT1 and the write reset signals WRT1 (delay time $\alpha$) is maintained stably, so that write and read operations in the line memory 210 can be done stably. Even when the phase relationship between the read reset signals RRT1 and the video signal varies, if the delay time is set at 0.5 H in order to start read operations with a delay of one-half of 1 H with respect to write operations on the line memory 210, it is possible to permit the phase change of a maximum of ±0.5 H on condition that a read operation does not precede a write operation. Therefore, in practical use, there is no chance of any problem arising in having write and read operations performed stably in the line memory 210.

Referring again to FIG. 7, the count output CP1 of the counter 330 is supplied to the decoder A 340 and to a decoder B 341 as well. The decoder B 341 outputs a decoding signal DP2 ((g) in FIG. 8) when the count output CP1 is less than a predetermined value. To be more specific, the decoder B 341 outputs a decoding signal DP2 until the counter 330 has counted the number of clock pulses required for reading effective video information written in the area from address 0 to address (l−1) of the line memory in FIG. 2. The decoding signal DP2 is supplied to a first input terminal of AND circuit 370.

The decoding signals DP1 of 1 H periods (namely, read reset signals RRT1, (f) in FIG. 8) are supplied to a clock terminal CLK of a counter 350. Supplied to a clear terminal CR of the counter 350 are clear signals CR1 ((d) in FIG. 8) from the delay circuit 320. After the count is initialized every 1 V, phase-locked with the video signal, the counter 350 counts decoding signals DP1 of 1 H periods. The count output CP2 of the counter 350 is supplied to the decoder C 360, which outputs decoding signals DP3 ((h) in FIG. 8) while the count output from the counter 350 is within a specified range. To be more specific, the decoder C 360 outputs decoding signals DP3 while the counter 350 is counting clock pulses (decoding signals DP1) corresponding to vertical blanking periods. The decoding signals DP3 are inverted to decoding signals $\overline{DP3}$ by an inverter 361, and decoding signals $\overline{DP3}$ are supplied to a second input terminal of the AND circuit 370. Reference clock pulses CK2 ((e) in FIG. 8) are supplied to a third terminal of the AND circuit 370. As a result, the reference clock pulses CK2 are AND-gated with a decoding signal DP2 and a decoding signal $\overline{DP3}$, and the AND circuit outputs the minimum number of clock pulses CK2' ((g) in FIG. 5, (h) in FIG. 6, (i) in FIG. 8) required not to read any redundant portions of the video signal such as vertical and horizontal blanking periods but to read only effective video information exclusive of the redundant video information, and those clock pulses CK' are supplied to a terminal 304.

The count output CP2 of the counter 350 is supplied also to a decoder D 380, and according to this count output CP2, the decoder D 380 outputs a decoding signal DP4 ((j) in FIG. 8) representing the first effective line of each field. Decoding signals DP4 and decoding signals DP1 (namely, read reset signals RRT1, (f) in FIG. 8) are supplied to AND circuit 390. Therefore, output as signals WRT2 ((k) in FIG. 8) to the terminal 306 by the AND circuit 390 are only those decoding signals DP1 indicating the first effective line of each field out of all decoding signals DP1. The signals WRT2 are a write reset signals for a field memory 220 (FIG. 2) to be described later.

An embodiment of the control circuit 300 according to the present invention has been described with reference to FIG. 8. As is evident from the above description, the control circuit 300 operates not according to the input video signal, but according to head switch-over signal SW and reference clock pulses CK2. Therefore, the control circuit 300 can generate read reset signals RRT1 and clock pulses CK2' extremely stably, thus allowing read operations to be performed on the line memory 210 fairly stably and without malfunctioning. In the above embodiment, the head switch-over signal SW is used, but this invention is not limited to this signal, and if a signal representing the rotational phase of the magnetic heads is used instead of the head switch-over signal SW, this does not depart from the spirit of the present invention.

As is clear from the above description, from the line memory 210 shown in FIG. 2, no redundant portions of the video signal such as vertical and horizontal blanking periods are read, but only effective video information exclusive of all redundant video information is read in units of one line stably, phase-locked with the input video signal neither more nor less even by one sample than the necessary amount of the information according to the read reset signals RRT1 and clock pulses CK2' generated as described.

Referring back to FIG. 2, the effective video information read from the line memory 210 is supplied to the field memory 220.

Figure 9:
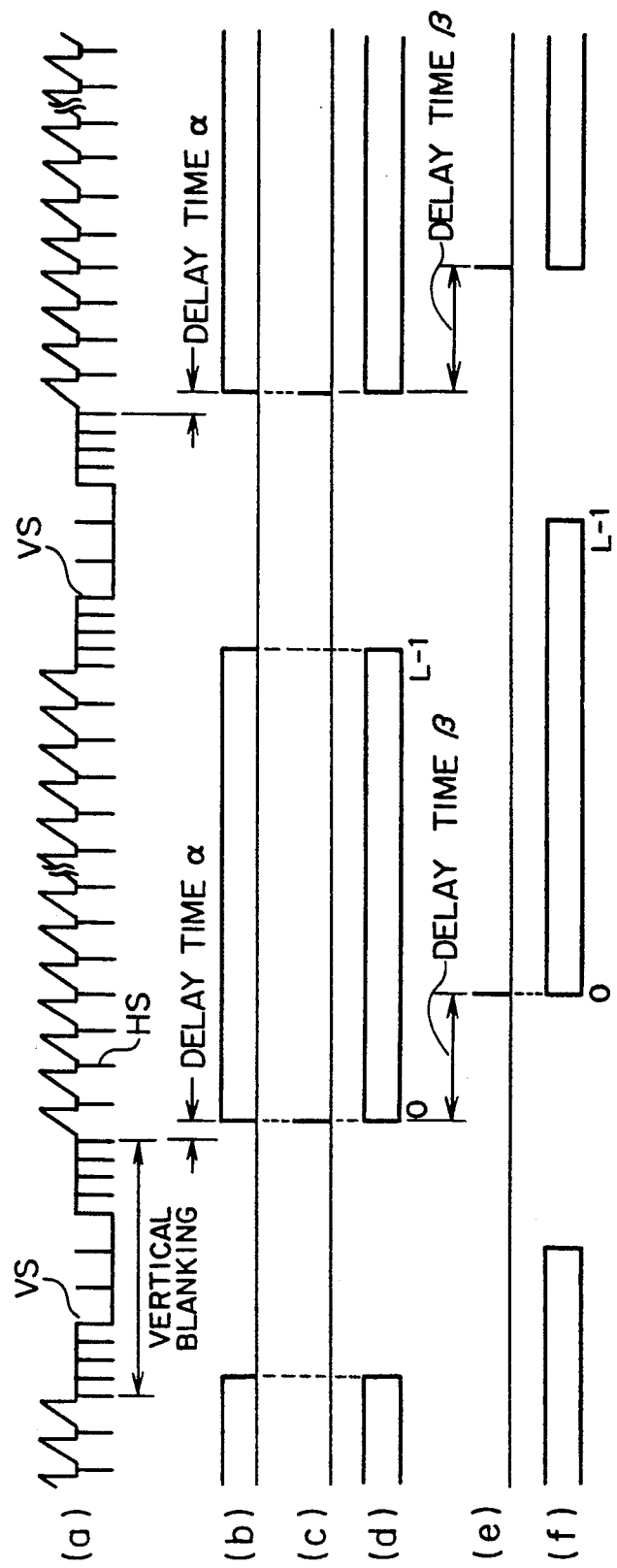
FIG. 9 is a waveform diagram showing the read/write operation in the field memory in FIG. 2.

With regard to the present embodiment, the write and read operations on the field memory 220 will be described using a waveform diagram of FIG. 9 for explaining the operation of the field memory 220 with reference to a case in which a FIFO memory for independent and asynchronous write and read operations is used for the field memory 220. Referring to FIG. 9, (a) indicates the input video signal supplied from the terminal 10 in FIG. 2, (b) indicates effective information read from the line memory 210, (c) indicates write reset signals WRT2 ((k) in FIG. 8) generated by the control circuit 300.

The field memory 220 has a capacity for storing all effective video information (sample number l) at least for a period of 1 V and permits write and read operations to be performed independently and asynchronously to each other. The same clock pulses CK2' that are supplied to the read clock terminal RCK of the line memory 210 are supplied to the clock terminal WCK of the field memory 220. Write reset signals WRT2 ((k) in FIG. 8, (c) in FIG. 9), which are generated by the control circuit 300, are supplied to the write reset terminal WR of the field memory 220. Therefore, after the write addresses are initialized (preset to address 0) by a write reset signal WRT2 at the start of each field, phase-locked with the input video signal ((a) in FIG. 9), the field memory 220 operates such that effective video information is read from the line memory 210 at timing of (d) in FIG. 9, phase-locked with the input video signal, and at the same time, only effective video information for 1 V is written in the area from address 0 to address (L−1) according to clock pulses CK2'. Therefore, when a horizontal synchronizing signal HS is lost by a dropout or noise or when noise N is separated erroneously along with a horizontal synchronizing signal HS, by the use of the line memory 210, effective video information for 1 V can be written correctly and stably in the area from address 0 to address (L−1).

Description will next be made of an operation of reading effective video information for 1 V written in the field memory, phase-locked with the input video signal as described above.

Figure 10:
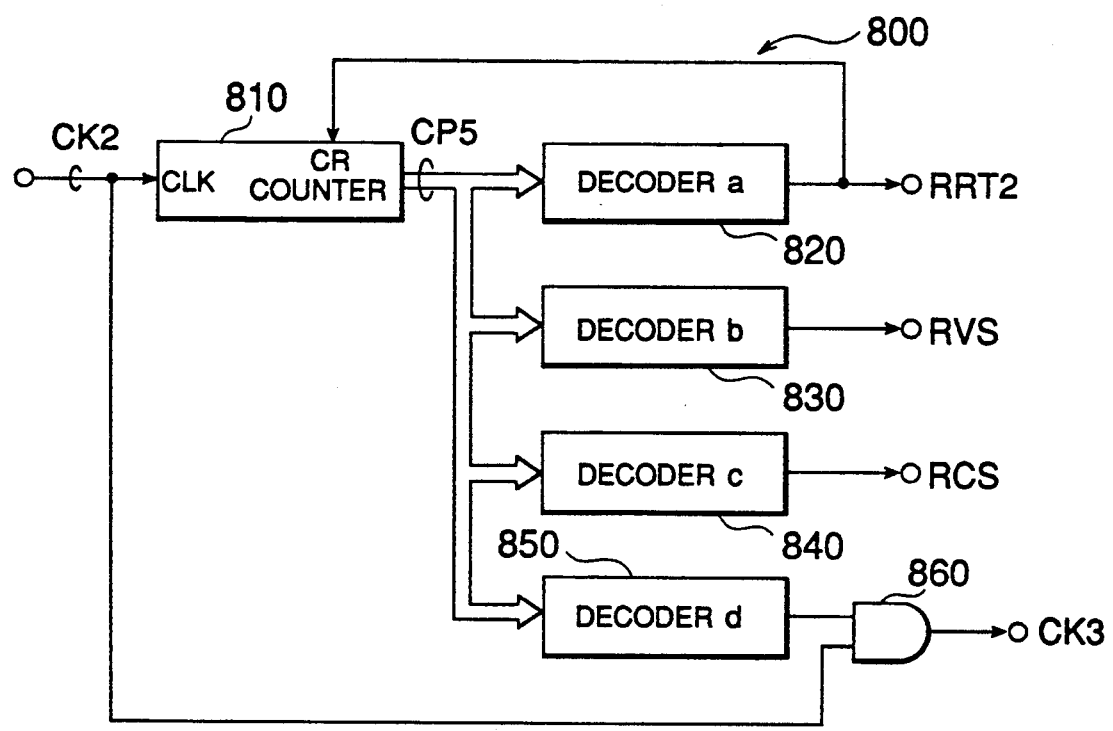
FIG. 10 shows a composition example of the reference signal generator circuit 800 in FIG. 2.

The field memory 220 is read according to read reset signals RRT2 and clock pulses CK3 respectively supplied to the read reset terminal RR and the read clock terminal RCK. The read reset signals RRT2 and the clock pulses CK3 are generated by a reference signal generator circuit 800. The reference signal generator circuit 800 comprises counters and so on like in the control circuit 300. The read reset signals RRT2 and the clock pulses CK3 are obtained by frequency division of the reference clock pulses CK2 from the crystal oscillator circuit 60. The reference signal generator circuit 800 can be formed by a counter 810 to which the reference clock pulses CK2 are input, decoders a to d 820 to 850 for which decode values are set, and an AND circuit 860 as shown in FIG. 10.

The read reset signal RRT2 is a stable reference signal with a 1 V period as shown in (e) of FIG. 9. Like the clock pulses CK2', the clock pulses CK3 are pulses with a frequency of $f_1$ having only the minimum number of pulses required to read all effective video information for 1 V written in the field memory 220 (to be more specific, the clock pulses are stopped in the redundant portions of the video signal such as vertical and horizontal blanking periods). Therefore, after the read addresses are initialized (preset to address 0) every 1 V by a read reset signal RRT2, the field memory 220 operates such that effective video information written in the area from address 0 to address (L−1) is read sequentially at timing shown in (f) of FIG. 9 in synchronism with the clock pulses CK3. The effective video information read from the field memory 220 is supplied to the D/A converter 3, which sequentially converts the video information from digital to analog signal in step with reference clock pulses CK2.

In the reference signal generator circuit 800, reference synchronizing signals RCS having the same form and frequency as those of the composite video signal (HS and VS in (a) of FIG. 6) and reference vertical synchronizing signals RVS are obtained from the reference clock pulses CK2 by dividing its frequency.

As has been described, from the field memory 220, only effective video information for 1 V is read sequentially, so that the video signal output from the D/A converter circuit 3 does not contain horizontal and vertical synchronizing signals HS and VS and horizontal and vertical blanking periods. In order to restore effective video information to a signal form like the input video signal, reference synchronizing signals RCS from the reference signal generator circuit 800 are inserted and added to the output from the D/A converter circuit 3 in a synchronizing insertion and addition circuit 400.

Reference vertical synchronizing signals RVS from the reference signal generator circuit 800 are output via a terminal 50 as a reference signal for a servo control unit, not shown, of this apparatus reproducing the video signal. By this reference signal the delay time in FIG. 9 is defined.

For the servo control unit, a well-known conventional servo control unit is used which is formed by a tracking control system for controlling the relative phase between the magnetic heads and the magnetic tape to reproduce signals correctly in a magnetic recording/reproducing apparatus such as a VTR which will be used with a reproduced video signal processing apparatus according to the embodiment show in FIG. 2.

As a reference vertical synchronizing signal RVS is input through the terminal 50 to the servo control unit, the input video signal supplied from the terminal 10 is servo-controlled so that the input video signal is phase-locked with the reference vertical synchronizing signals RVS.

To be more concrete, the input video signal is servo-controlled so that the reference vertical synchronizing signals RVS are phase-locked with vertical synchronizing signals of the input video signal in a manner that the former lags the latter.

By this servo control, as shown in FIG. 9, read operations from the field memory 220 lag write operations by time $\beta$. If the time $\beta$ is set at 0.5 V, the time base variation of the input video signal can be permitted to a maximum of ±0.5 V with respect to the reference vertical synchronizing signals RVS. So, a reproduced video signal processing apparatus according to the embodiment shown in FIG. 2 can be provided with a time base variation correction amount of a maximum of ±0.5 V by use of the field memory 220. As a result, all the effective video information written in the field memory can be read correctly on a stable time base without reading even one sample too many or too few, and blanking periods and synchronizing information, which were excluded, are replaced by reference synchronizing signals RCS supplied by the synchronizing insertion and addition circuit 400 on the same stable time base as in the above-mentioned reading operation. Therefore, a stable video signal exclusive of the time base variations of the input video signal is correctly restored and output from the terminal 20.

In this embodiment, description has been made of a case in which reference clock pulses CK2 ($f_1$) are generated separately in the crystal oscillator circuit 60 and reference synchronizing signals RCS are generated by the reference signal generator circuit 800 in the apparatus. However, to synchronize with reference synchronizing signals from outside, a PLL circuit shown in FIG. 11 may be used to obtain reference clock pulses as mentioned above, and this does not depart from the spirit of the present invention.

Figure 11:
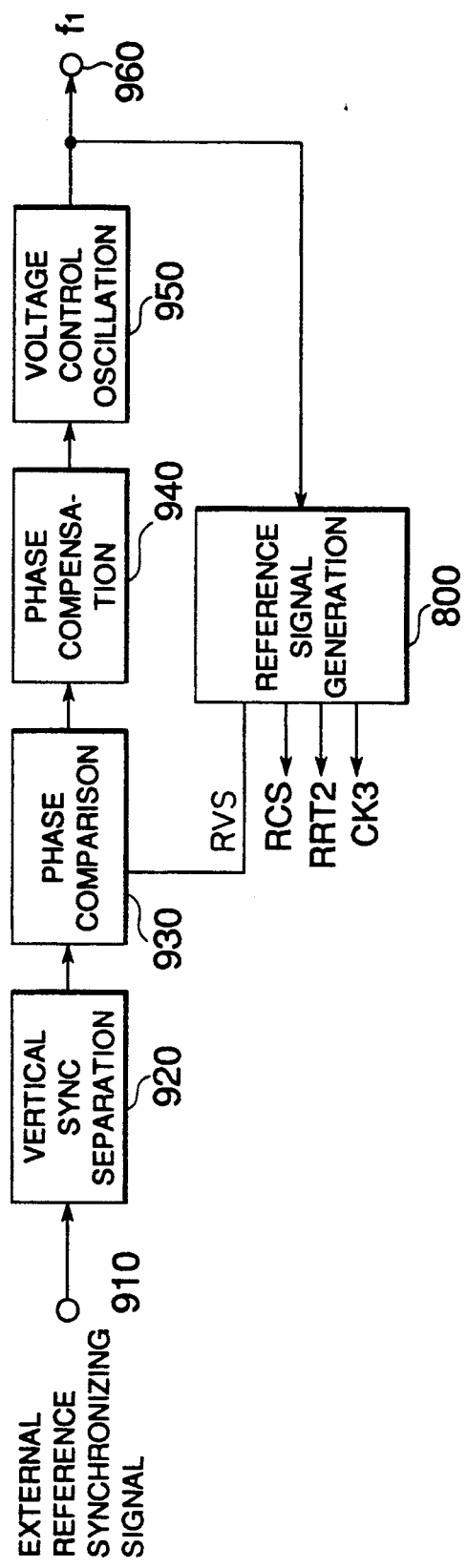
FIG. 11 shows a composition example showing a modification of the quartz oscillator circuit in FIG. 2.

To be more specific, in FIG. 11, reference numeral 800 indicates the same reference signal generator circuit as in FIG. 2, which is therefore designated by the same reference numeral. The reference signal generator circuit 800 generates a reference synchronizing signal RCS, a reference vertical synchronizing signal RVS, a read reset signal RRT2, and clock pulses CK3. Clock pulses output from a voltage control oscillation circuit 950 are supplied to the input of the reference signal generator circuit 800. A synchronizing signal which includes vertical and horizontal synchronizing signal of a video signal supplied externally and in a same style as in reference synchronizing signal RCS generated at reference signal generator 800 is input through a terminal 910, and vertical synchronizing signals are separated and output by a vertical synchronizing separation circuit 920. The external reference synchronizing signals and the internal reference vertical synchronizing signals RVS from the reference signal generator circuit 800 are compared in terms of phase by a phase comparator circuit 930, and an error voltage according to a phase difference between them is output from the phase comparator circuit 930. The error voltage is supplied as a control voltage to the voltage control oscillator circuit through a phase compensator circuit 940. By the PLL circuit composed of those circuits mentioned above, the internal reference vertical synchronizing signals RVS from the reference signal generator circuit 800 are phase-locked with the external reference vertical synchronizing signals. Pulses of the same frequency ($f_1$) as the reference clock pulses CK2 from the crystal oscillator circuit 60 are produced by the voltage control oscillator circuit 950 and output from the terminal 960.

If the crystal oscillator 60 in FIG. 2 is replaced by the voltage control oscillator circuit 950 according to the embodiment of FIG. 11, the reproduced video signal processing apparatus of the present invention can be operated synchronized with external signals.

As discussed above, since the clock pulses CK1, CK2, CK2', and CK3 have the same frequency ($f_1$), the input video signal is cleared only of its portions of time base variations. Therefore, it never happens that the waveform is distorted by contraction or expansion of the time base in the write and read operations on the line memory 210 and the field memory 220. However, this invention is not limited to the above arrangement, but if, as clock pulses to be supplied to the reference signal generator circuit 800 and the D/A conversion circuit 3, clock pulses CK4 having a frequency ($f_2$) different from that of the reference clock pulses CK2 are used, this will provide a time base change function to contract or expand the time base of the input video signal in addition to the time base variation removal function.

If FIFO memories are used for the line memory 210 and the field memory 220, the write and read addresses are automatically updated in step with clock pulses supplied by a built-in address counter, so that an external address generator circuit is not required. Moreover, even when a horizontal synchronizing circuit HS is lost due to a dropout, for example, it is not necessary to contrive a circuit to make up for the lost signal to carry on specified signal processing. Therefore, the memory control circuit can be simplified, and also signal processing can be simplified. Another effect is that since the FIFO type memory is generally capable of high-speed write/read operations, the signals can be processed at high speed.

As is evident from the description of the operation of the apparatus of this invention, the field memory 220 is connected with the line memory 210, the line memory 210 functions as a one-line buffer memory, and when a horizontal synchronizing signal is lost by a dropout or noise or when noise N is separated out along with horizontal synchronizing signals HS, the effect of this phenomenon is confined to the line in question, so that the other lines are not affected. Therefore, it is not necessary to contrive a circuit to compensate for the lost horizontal synchronizing signals HS to perform specified signal processing, but the whole system can be operated stably without malfunctioning. That is to say, it is possible to compose a reproduced video signal processing apparatus which processes signals in a simple manner and is provided with a necessary and sufficient correction amount of the time base variation.

If FIFO memories are used for the line memory 210 and the field memory 220, an address generator need not be provided, the memory control circuit can be simplified, high-speed write/read operations can be performed, so that the circuit size can be reduced. In short, a reproduced video signal processing apparatus can be formed which is simple but capable of high-speed signal processing.

Description will now be made of a dropout compensation method to make up for video information which is lost by dropout in the embodiment shown in FIG. 2.

When an envelope of a reproduced high-frequency (RF) signal is detected and if its amplitude falls below a specified level, a decision is made that a dropout has occurred, and a dropout signal DOP is input through the terminal 120.

Generally, the memories are each provided with a write enable terminal $\overline{WE}$. The memories operate such that data is written when a signal supplied to the write enable terminal $\overline{WE}$ is at "L" level but data is not written and data written previously is maintained when the signal is at "H" level, for example. Therefore, by supplying a dropout signal DOP to the write enable terminal $\overline{WE}$ of the field memory 220, that portion of the input video information which is lost due to a dropout period is replaced with the video information of the previous line. Consequently, without increasing the circuit size, dropout compensation can be performed in the field memory 220. As described earlier, data is written through the line memory 210 into the field memory 220, so that the effective video information read from the line memory 210 lags the input video information by time $\alpha$.

As shown in FIG. 2, by supplying a dropout signal DOP given through the terminal 120, which is delayed by time $\alpha$ by the delay circuit 700, the missing video information can be compensated, so that a good picture can be obtained.

Figure 12:
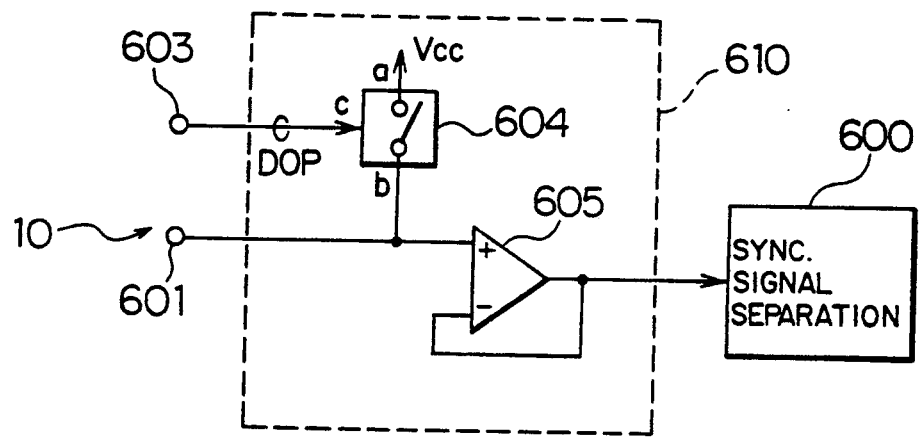
FIG. 12 shows a composition example of a circuit for preventing false separation of a synchronizing signal inserted before the synchronizing separation circuit in FIG. 2.
Figure 13:
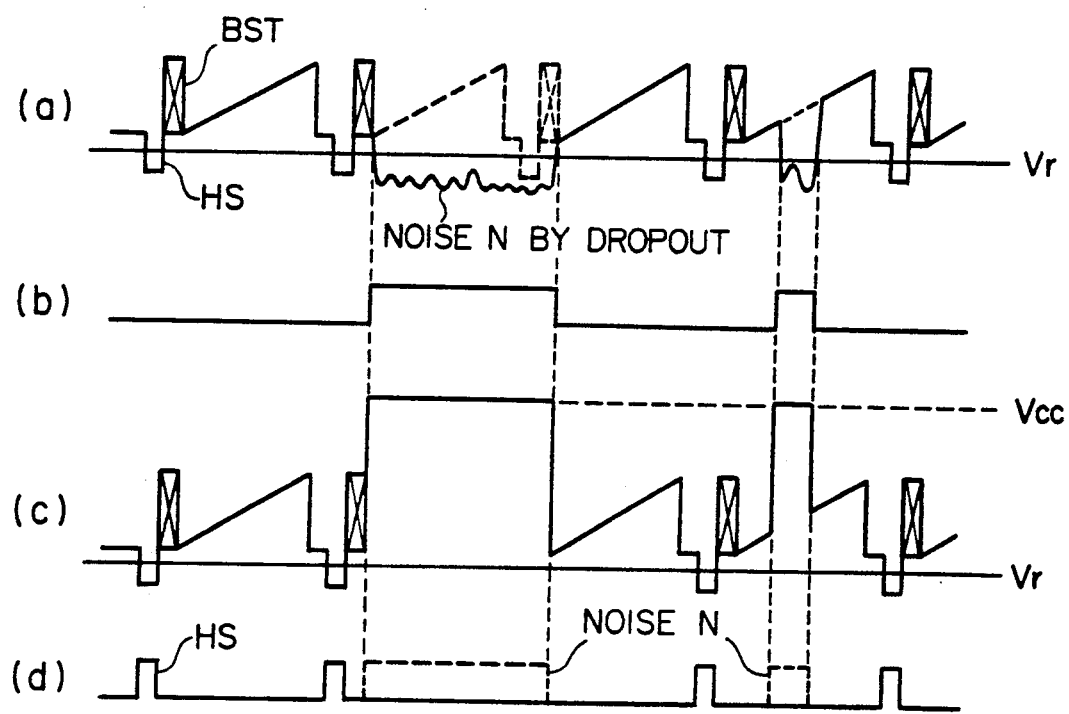
FIG. 13 is a waveform diagram showing the operation of the circuit shown in FIG. 12.

FIG. 12 shows a signal processing circuit 610 for preventing the synchronizing information separation circuit 600 from separating noise N caused by a dropout along with synchronizing information such as horizontal synchronizing signals HS and vertical synchronizing signals VS. FIG. 13 is a waveform diagram for explaining the operation of the signal processing circuit in FIG. 12.

The synchronizing information separation circuit 600 in FIG. 12 may be a well-known conventional synchronizing information separation circuit which compares the input video signal ((a) in FIG. 13) with a specified threshold value Vr in terms of amplitude, and separates and outputs the synchronizing information. Therefore, as shown in (a) of FIG. 13, when noise N occurs caused by a dropout, the synchronizing information separation circuit 600 erroneously separates and outputs noise N along with the synchronizing information (the broken line in (d) of FIG. 13). The signal processing circuit 610 of FIG. 12 prevents this error and is connected as a preceding stage with respect to the synchronizing information separation circuit 600.

In FIG. 12, the input video signal ((a) in FIG. 13) arriving at the terminal 10 in FIG. 2 is input through the terminal 601, and supplied to the input terminal of a buffer amplifier 605. A dropout signal DOP ((b) in FIG. 13) arriving at the terminal 120 in FIG. 2 is input through the terminal 603, and supplied to the control terminal C of an analog switch 604. The terminals a and b of the analog switch 604 are connected to a power source Vcc and the input terminal of the buffer amplifier, and the analog switch 604 opens when the dropout signal DOP is at "H" level, and closes when this signal is at "L" level. Therefore, when a dropout occurs, the input terminal of the buffer amplifier 605 is connected through the analog switch 604 to the power source Vcc. As a result, the video signal output from the buffer amplifier 605 is fixed at the power supply level Vcc for a dropout period as shown in (c) of FIG. 13. Therefore, as the output of the buffer amplifier is supplied to the known prior-art synchronizing information separation circuit 600, even when a dropout occurs, noise N resulting from the dropout is invariably fixed at the power source level Vcc, the noise N is never separated and output erroneously by the synchronizing information separation circuit 600 through the comparison process with a specified threshold value Vr, so that only correct synchronizing information (indicated by the solid line (d) in FIG. 13) is separated and output.

By the foregoing arrangement, the write operation on the line memory 210 in FIG. 2 is not disturbed by the noise N as mentioned above, with the result that the specified signal processing can be performed stably and a good reproduced picture can be obtained by the output from the terminal 20.

Figure 14:
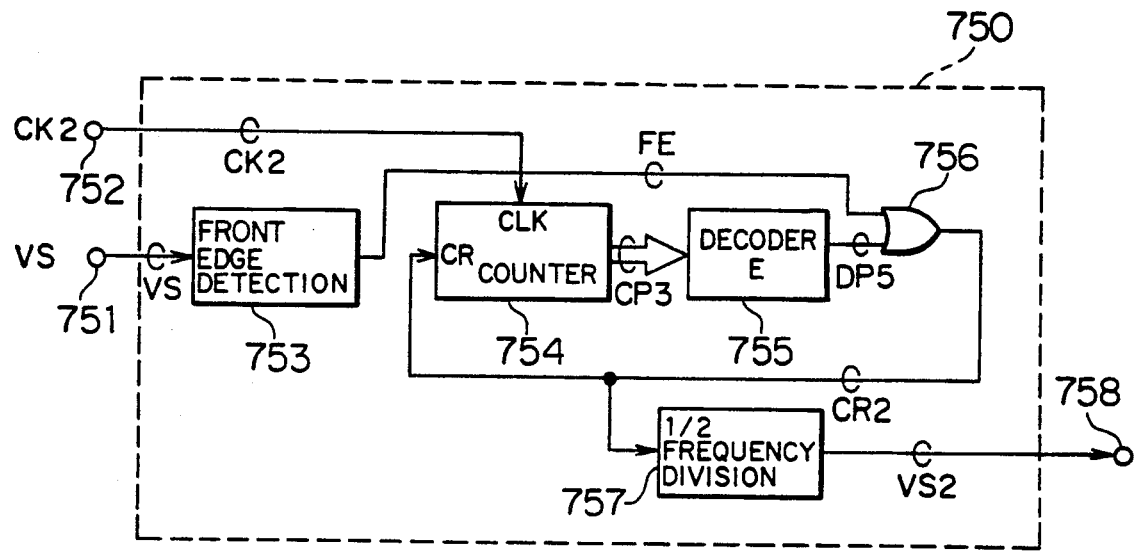
FIG. 14 is a composition example of a circuit for generating read reset signals RRT1 based on vertical synchronizing signals VS separated and output from the synchronizing separation circuit in FIG. 2.
Figure 15:
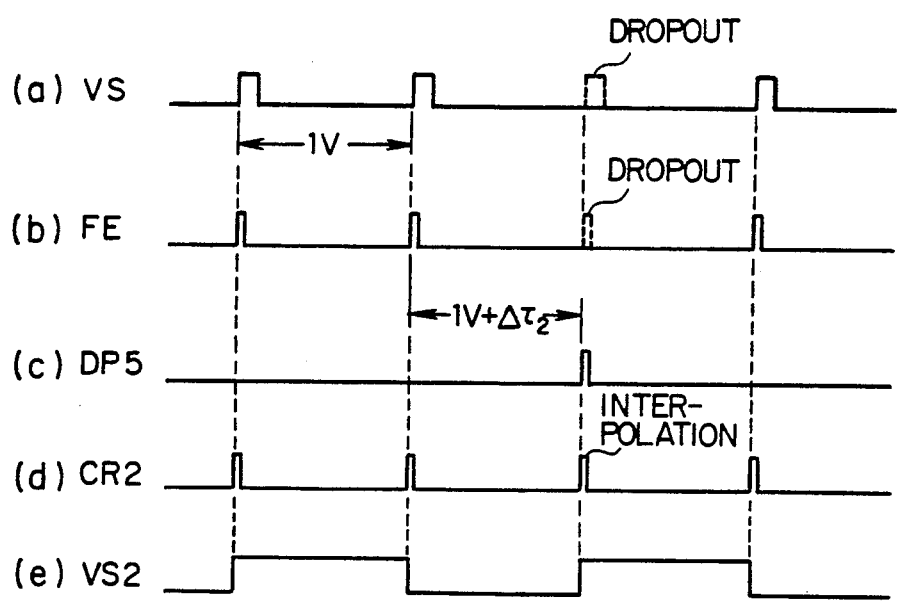
FIG. 15 is a wave diagram showing the operation of the circuit in FIG. 14.

In the above-mentioned embodiment, as shown in FIG. 7, the read reset signal RRT1 and so on are generated based on a head switch-over signal SW. However, these signals may be generated based on the input video signal. More specifically, if, instead of supplying the head switch-over signal SW, signals VS2 obtained by ½ frequency division of the vertical synchronizing signal VS separated by the synchronizing information separation circuit 600 in FIG. 2 are supplied to the terminal 301 in FIG. 7, read reset signals RRT1 and so on can be generated which are phase-locked with the input video signal. For this purpose, it is necessary to make up for the lost vertical synchronizing signals VS due to dropouts or the like to produce the above-mentioned signals VS2. FIG. 14 shows an embodiment of a circuit 750 to make up for the lost vertical synchronizing signals VS to stably generate the signals VS2 mentioned above. FIG. 15 is a waveform diagram for explaining the operation of the circuit 750.

In FIG. 14, vertical synchronizing signals VS ((a) in FIG. 15) separated by the synchronizing information separation circuit 600 are input through a terminal 751, and supplied to a front edge detection circuit 753. The front edge detection circuit 753 detects the front edges of the vertical synchronizing signals VS, and outputs front edge detection signals FE shown in (b) of FIG. 15. The front edge detection signals FE are converted into clear signals CR2 ((d) in FIG. 15) by an OR circuit 756 and supplied to the clear terminal CR of a counter 754. On the other hand, the reference clock pulses CK2 from the crystal oscillator circuit 60 in FIG. 2 are input through a terminal 752, and supplied to a clock terminal CLK of the counter 754.

Therefore, when a vertical synchronizing signal VS is separated, after the count is initialized by a clear signal CR2 at the timing of the front edge of a vertical synchronizing signal VS, the counter 754 starts counting clock pulses CK2. A decoder E 755 receives the count output CP3 of the counter 754. When the count output CP3 reaches a predetermined value, the decoder E 755 outputs a decoding signal DP5 ((c) in FIG. 15). The decoder E 755 has a decode value set thereon so as to output a decoding signal DP5 when the counter 754 has counted the number of clock pulses corresponding to a time of 1 V + $\Delta\tau_2$ ($\Delta\tau_2 <$ < 1 V). Therefore, when a vertical synchronizing signal VS is separated, the count output CP3 of the counter 754 is unable to reach the decode value, so that the decoder E 755 does not output a decoding signal DP5. However, when a vertical synchronizing signal VS is lost, a decoding signal DP5 is output at a point in time close to the front edge of the lost vertical synchronizing signal VS. This decoding signal DP5 becomes a clear signal CR2 as it is applied to the OR circuit 756, and supplied to the clear terminal CR of the counter 754. After the count initialized by a clear signal CR2 based on this decoding signal DP5, the counter 754 starts counting of clock pulses CK2. Therefore, the clear signal CR2 ((d) in FIG. 15) output from the OR circuit 756 becomes a signal representing the front edge of a vertical synchronizing signal VS which is compensated by a decoding signal DP5 when a vertical synchronizing signal VS is lost. When a vertical synchronizing signal VS is lost by a dropout or the like, the signal VS2 ((e) in FIG. 15), the frequency of which is ½ of the frequency of the vertical synchronizing signal VS, can be generated stably from the clear signal CR2 by dividing its frequency by 2.

As is apparent from the above description, the signal VS2 generated based on the vertical synchronizing signal VS of the input video signal corresponds to the head switch-over signal SW and is phase-locked with the input video signal. Therefore, instead of inputting the head switch-over signal SW to the control circuit 300, by providing the circuit 750 in FIG. 14 which processes the vertical synchronizing signal VS separated by the synchronizing separation circuit 600 in FIG. 2 and inputting the signal VS2 generated by the circuit 750 to the control circuit 300, the read reset signal RRT1 phase-locked with the input video signal and other signals can be similarly generated and this does not depart from the spirit of the present invention.

In the memory system as the embodiment of this invention in FIG. 2, the line memory 210 and the field memory 220 are connected in cascade connection, but this invention is not limited to this arrangement. For example, instead of the field memory 220, a frame memory (with a capacity for storing all effective video information at least in one frame) may be used. If this frame memory is operated such that the write addresses and the read addresses are reset for each frame by a write reset signal and a read reset signal, respectively, and that the read operation lags the write operation by time $\beta_1$ ($0 < \beta_1 < 1$), then the time base difference is similarly corrected, and when a dropout occurs, the dropout can be compensated by the video information of the previous frame, so that a good picture can be obtained. In this case, the reproduced video signal processing apparatus is provided with an ability to correct the time base variation of a maximum of ±1 V.

In the above embodiment, description has been made of a case in which the line memory 210 and the field memory 220 are formed by FIFO memories. However, this invention is not limited to the use of FIFO memories, but RAMs of any type may be used and this does not depart from the spirit of the present invention.

When ordinary RAMs are used for the line memory 210 and the field memory 220, for example, as a read address signal of the line memory 210, the count output CP1 of the counter 330 in FIG. 7 may be used instead of the read reset signal RRT1 described with reference to the above embodiment. In addition, as a write address signal, the count output CPO of the counter 101 in FIG. 3 may be used instead of the write reset signal WRT1 in the current arrangement described above.

Similarly, as a write address signal of the field memory 220, count outputs CP1 and CP2 in FIG. 7 may be used instead of the write reset signal WRT2 in the current arrangement. The count output CP2 is the count output which is initialized by clear signal CR1 every 1 V and updated by read reset signal RRT1 every 1 H. The count output CP1 is the count output which is initialized by read reset signal RRT1 every 1 H and updated by reference clock CK2. Therefore, the count output CP2 as a write address signal of the field memory 220 may be supplied as an upper-rank address signal representing a line position and the signal CP1 may be supplied as a lower-rank address signal representing the addresses for one line of the video information.

In addition, for the read addresses of the field memory 220, the count output CP5 of the counter 810 in FIG. 10 may be supplied instead of a read reset signal RRT2 in the current arrangement.

Generally, the memory system in this invention may be composed by connecting a line memory 210 and a memory having an ability to store effective video information for N lines (N≧2) (hereinafter referred to as an N-line memory) in a cascade connection. If the N-line memory is arranged to operate such that the write addresses and the read addresses are initialized every N lines respectively by a write reset signal and a read reset signal and that the read operation lags the write operation by time $\beta_2$ ($0<\beta_2<N$ lines, N lines=$N\times H$), the time base variation can be corrected similarly. Therefore, a reproduced video signal processing apparatus according to the present invention can be formed which has an ability to correct the time base variation of a maximum of $\pm N\times H/2$ when the time $\beta_2$ is $N\times H/2$.

Figure 16A:
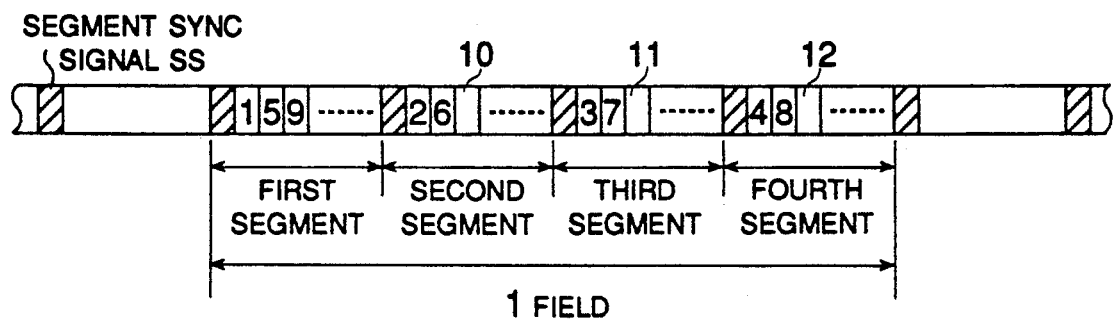
FIGS. 16A and 16B are composition diagrams showing another embodiment using segments.

This invention can be applied also to helical scanning segment recording type magnetic recording/reproducing apparatus for recording the video signal for one field divided into a plurality of tracks. As a concrete example, this invention can be applied without causing any problem to a case in which the video signal is recorded and reproduced in a record signal format having segment synchronizing signals inserted at the leading positions of the segments instead of using the vertical synchronizing signals as shown in FIG. 16A (4-segment recording system). In this case, it is possible to use as an N-line memory a segment memory system (each memory having a capacity to store all effective video information at least in one segment). If this memory system is operated such that the write addresses and the read addresses are initialized segment after segment by a write reset signal and a read reset signal and the read operation lags the write operation by time $\beta_3$ ($0<\beta_3<1$ segment period; 1 segment period is written as 1 S), the time base variation can be corrected similarly, and the reproduced video signal processing apparatus according to this invention is provided with an ability to correct the time base variation of a maximum of $\pm S/2$ when the above-mentioned time $\beta_3$ is $S/2$.

This invention can be applied without causing any problem to a case in which the video signal is recorded and reproduced in a record signal format which is arranged in such a way that the video signal is cyclically allotted to the first segment to the fourth segment of each line and that the first line, the fifth line, ninth line and so on of the video signal are arranged in the first segment; the second line, the sixth line, tenth line and so on of the video signal are arranged in the second segment; the third line, seventh line, eleventh line and so on of the video signal are arranged in the third segment; and the fourth line, the eighth line, the twelfth line and so on of the video signal are arranged in the fourth segment.

Figure 16B:
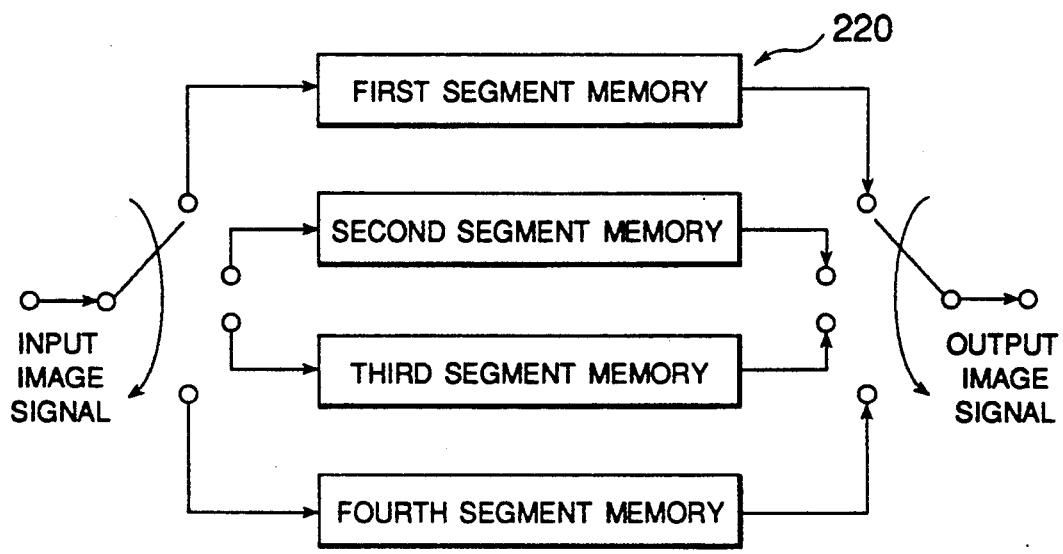

Specifically, the field memory 220 in FIG. 2 is formed by the first segment memory for storing the signals in the first segment, the second segment memory for storing the signals in the second segment, the third segment memory for storing the signals in the third segment and the fourth segment memory for storing the signals in the fourth segment as shown in FIG. 16B, and the signals of each segment are passed through the line memory and are written sequentially in specified address areas of the corresponding segment memories in segment units as shown in FIG. 17A. And, the first to fourth segment memories are selected sequentially for the individual lines, and then the signals of the respective lines written in the first to fourth segment memories are read, so that the original video signals can be restored with the time base variations removed as shown in FIG. 17B.

Figure 18A:
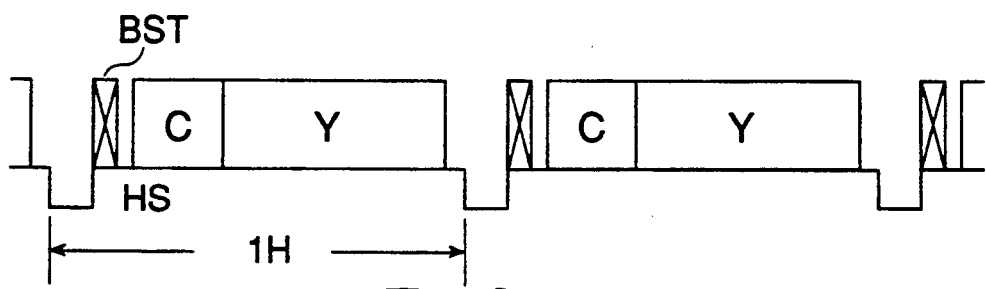
FIGS. 18A and 18B are signal composition diagrams showing still another embodiment handling video signal in which signals are multiplexed in time division.
Figure 18B:
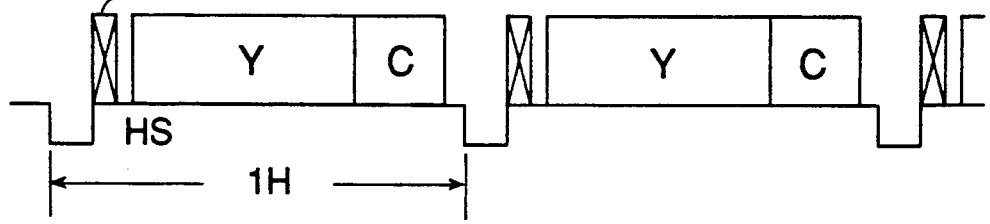

This invention is not limited to conventional video signals (NTSC signal, etc.), but can be applied without causing any problem to video signals multiplexed in time division by allotting the luminance signal Y and the color signal along with horizontal synchronizing information (a horizontal synchronizing signal HS and a burst signal BST in 1 H) as shown in FIGS. 18A-18B.

According to the forgoing embodiments, it is possible to form a reproduced video signal processing apparatus with the reduced circuit size which performs simple high-speed signal processing, and operates stably without malfunctioning even when any of the synchronizing information is lost by a dropout or the like, and which is provided with a necessary and sufficient correction amount of the time base variation. The reproduced video signal processing apparatus can stably and securely eliminate the time base variations included in the input video signal. The reproduced video signal processing apparatus can also be provided not only with a function of a time base change unit for contracting or expanding the time base without increasing the circuit size but with a dropout compensation function.

We claim:

1. A video signal processing apparatus comprising:
   first memory means, having a video information storage capacity for one line of an input video signal, for receiving a video signal at the input side thereof;
   second memory means with a storage capacity of N lines (N is an integer of 2 or more) of said input video signal, said second memory means capable of having written therein the video signal output from said first memory means;
   synchronizing information separation means for receiving said video signal, and separating synchronizing information from the video signal and outputting said separated synchronizing information;
   a first clock generating circuit for generating first clock pulses of a specified frequency synchronized with said video signal on the basis of the synchronizing information separated and output by said synchronizing information separation means;
   first control means for generating a specified first control signal on the basis of said first clock pulses generated by said first clock generating means and the synchronizing information separated and output by said synchronizing information separation means;

second clock generating means for generating second clock pulses of a specified frequency;

second control means for generating a specified second control signal on the basis of the second clock pulses generated by said second clock generating means; and reference signal generating means for generating a specified reference signal on the basis of said second clock pulses;

wherein said video signal is written sequentially in a specified address area of said first memory means according to said first control signal, the video signal written in the first memory means according to said first control signal is read sequentially according to said second control signal, the read video signal is written sequentially in a specified address area of said second memory means according to said second control signal, and the video signal written in said second memory means according to said second control signal is read sequentially according to said reference signal; and wherein said second control means receives a rotational phase signal representing the rotational phase of video signal recording/reproducing means for reproducing a video signal from a recording medium on which the video signal is recorded, and generates said second control signal according to said rotational phase signal and said second clock pulses.

2. A video signal processing apparatus according to claim 1, further comprising dropout compensation means, provided at the input side of said synchronizing information separation circuit, for receiving an input video signal and a specified dropout detection signal indicating a detection of a dropout of the input video signal, and outputting a specified level of a signal to said synchronizing information separation circuit when a dropout of the input video signal is indicated by the dropout detection signal.

3. A video signal processing apparatus according to claim 1, wherein there is further provided delay means for receiving a specified dropout detection signal representing a dropout of said video signal, and delaying said dropout detection signal by a specified time, and wherein by an output from said delay means, writing in said second memory means of the video signal read from said first memory means is delayed.

4. A video signal processing apparatus according to claim 1, wherein said second memory means comprises a plurality of segment memories arranged in parallel, and wherein the video information for one line read from said first memory means is written sequentially line by line in the segment memories constituting said second memory means.

5. A video signal processing apparatus according to claim 1, wherein said first and second memory means are formed by a first-in first-out memory enabling asynchronous write and read operations.

6. A video signal processing apparatus comprising:

first memory means, having a video information storage capacity for one line of an input video signal, for receiving a video signal at the input side thereof;

second memory means with a storage capacity of N lines (N is an integer of 2 or more) of said input video signal, said second memory means capable of having written therein the video signal output from said first memory means;

synchronizing information separation means for receiving said video signal, and separating synchronizing information from the video signal and outputting said separated synchronizing information;

a first clock generating circuit for generating first clock pulses of a specified frequency synchronized with said video signal on the basis of the synchronizing information separated and output by said synchronizing information separation means;

first control means for generating a specified first control signal on the basis of said first clock pulses generated by said first clock generating means and the synchronizing information separated and output by said synchronizing information separation means;

second clock generating means for generating second clock pulses of a specified frequency;

second control means for generating a specified second control signal on the basis of the second clock pulses generated by said second clock generating means; and reference signal generating means for generating a specified reference signal on the basis of said second clock pulses;

wherein said video signal is written sequentially in a specified address area of said first memory means according to said first control signal, the video signal written in the first memory means according to said first control signal is read sequentially according to said second control signal, the read video signal is written sequentially in a specified address area of said second memory means according to said second control signal, and the video signal written in said second memory means according to said second control signal is read sequentially according to said reference signal; and wherein said second clock generating means comprises a PLL circuit including a voltage controlled oscillator for generating said second clock pulses of a specified frequency in phase synchronization with a reference synchronizing signal.

7. A time base correction apparatus comprising:

first memory means for storing video information of an input video signal and reading out the video information stored by the first memory means, the first memory means having a storage capacity of one line of video information of the input video signal, the input video signal being reproduced from a recording medium by reproducing means for reproducing a video signal, the reproducing means having a rotational phase indicated by a rotational phase signal and being controlled by servo control means for controlling a relative phase between the reproducing means and the recording medium based on a servo control reference signal;

second memory means for storing the video information read out by the first memory means and reading out the video information stored by the second memory means, the second memory means having a storage capacity of N lines of video information of the input video signal, N being an integer greater than 1;

synchronizing separation means for separating synchronizing information from the input video signal to produce separated synchronizing information;

first clock generating means for generating first clock pulses having a predetermined frequency synchronized with the input video signal based on the separated synchronizing information;

first control means for generating a first control signal based on the first clock pulses and the separated synchronizing information;

second clock generating means for generating second clock pulses having a predetermined frequency;

second control means for generating a second control signal based on the rotational phase signal and the second clock pulses;

reference signal generating means for generating a third control signal, a reference synchronizing signal, and the servo control reference signal for the servo control means based on the second clock pulses;

wherein the first memory means stores video information of the input video signal in a predetermined area of the first memory means based on the first control signal and reads out the video information stored by the first memory means in synchronism with the rotational phase signal based on the second control signal;

wherein the second memory means stores the video information read out by the first memory means in a predetermined area of the second memory means in synchronism with the rotational phase signal based on the second control signal and reads out the video information stored by the second memory means based on the third control signal.

8. A time base correction apparatus according to claim 7, wherein the second control means generates the second control signal such that the first memory means begins to read out the video information stored by the first memory means after a delay of a time $\alpha$ from a time the first memory means begins to store video information of the input video signal, wherein $0 < \alpha < 1$ H, H being one horizontal scanning period of the input video signal corresponding to one line of the input video signal; and wherein the reference signal generating means generates the third control signal and the servo control reference signal such that the second memory means begins to read out the video information stored by the second memory means after a delay of a time $\beta$ from a time the second memory means begins to store the video information read out by the first memory means, wherein $0 < \beta < (N \times H)$.

9. A time base correction apparatus comprising:

first memory means for storing video information of an input video signal and reading out the video information stored by the first memory means, the first memory means having a storage capacity of one line of video information of the input video signal, the input video signal being reproduced from a recording medium by reproducing means for reproducing a video signal, the reproducing means having a rotational phase indicated by a rotational phase signal and being controlled by servo control means for controlling a relative phase between the reproducing means and the recording medium based on a servo control reference signal;

second memory means for storing the video information read out by the first memory means and reading out the video information stored by the second memory means, the second memory means having a storage capacity of N lines of video information of the input video signal, N being an integer greater than 1;

synchronizing separation means for separating synchronizing information from the input video signal to produce separated synchronizing information;

first clock generating means for generating first clock pulses having a predetermined frequency synchronized with the input video signal based on the separated synchronizing information;

first control means for generating a first control signal based on the first clock pulses and the separated synchronizing information;

second clock generating means for generating second clock pulses having a predetermined frequency;

second control means for generating a second control signal based on the separated synchronizing information and the second clock pulses;

reference signal generating means for generating a third control signal, a reference synchronizing signal, and the servo control reference signal for the servo control means based on the second clock pulses;

wherein the first memory means stores video information of the input video signal in a predetermined area of the first memory means based on the first control signal and reads out the video information stored by the first memory means in synchronism with the separated synchronizing information based on the second control signal;

wherein the second memory means stores the video information read out by the first memory means in a predetermined area of the second memory means in synchronism with the separated synchronizing information based on the second control signal and reads out the video information stored by the second memory means based on the third control signal.

10. A time base correction apparatus according to claim 9, wherein the second control means generates the second control signal such that the first memory means begins to read out the video information stored by the first memory means after a delay of a time $\alpha$ from a time the first memory means begins to store video information of the input video signal, wherein $0 < \alpha < 1$ H, H being one horizontal scanning period of the input video signal corresponding to one line of the input video signal; and wherein the reference signal generating means generates the third control signal and the servo control reference signal such that the second memory means begins to read out the video information stored by the second memory means after a delay of a time $\beta$ from a time the second memory means begins to store the video information read out by the first memory means, wherein $0 < \beta < (N \times H)$.

* * * * *